US012052992B2

(12) United States Patent
Leroy Rene-Boisneuf et al.

(10) Patent No.: US 12,052,992 B2
(45) **Date of Patent: *Aug. 6, 2024**

(54) INSECTICIDAL COMPOSITION

(71) Applicant: CLARKE MOSQUITO CONTROL PRODUCTS, INC., St. Charles, IL (US)

(72) Inventors: Laeticia Leroy Rene-Boisneuf, Naperville, IL (US); Yemi Susan Bullen-McClain, Vernon Hills, IL (US); Rajeev Vaidyanathan, St. Charles, IL (US); William Carl Jany, Melrose Park, IL (US)

(73) Assignee: CLARKE MOSQUITO CONTROL PRODUCTS, INC., St. Charles, IL (US)

( * ) Notice: Subject to any disclaimer, the term of this patent is extended or adjusted under 35 U.S.C. 154(b) by 920 days.

This patent is subject to a terminal disclaimer.

(21) Appl. No.: 17/036,149

(22) Filed: Sep. 29, 2020

(65) Prior Publication Data

US 2021/0106007 A1 Apr. 15, 2021

Related U.S. Application Data

(63) Continuation of application No. 15/894,762, filed on Feb. 12, 2018, now Pat. No. 10,980,235.

(60) Provisional application No. 62/584,581, filed on Nov. 10, 2017, provisional application No. 62/545,114, filed on Aug. 14, 2017, provisional application No. 62/458,321, filed on Feb. 13, 2017.

(51) Int. Cl.

| | |
|---|---|
| ***A01P 7/04*** | (2006.01) |
| ***A01N 25/00*** | (2006.01) |
| ***A01N 25/06*** | (2006.01) |
| ***A01N 25/14*** | (2006.01) |
| ***A01N 25/30*** | (2006.01) |
| ***A01N 35/06*** | (2006.01) |
| ***A01N 43/30*** | (2006.01) |
| ***A01N 51/00*** | (2006.01) |
| ***A01N 53/00*** | (2006.01) |
| ***A01N 63/00*** | (2020.01) |

(52) U.S. Cl.

CPC ............. *A01N 53/00* (2013.01); *A01N 25/06* (2013.01); *A01N 25/30* (2013.01); *A01N 35/06* (2013.01); *A01N 43/30* (2013.01); *A01N 51/00* (2013.01)

(58) Field of Classification Search

CPC .... A01N 25/06; A01N 53/00; A01N 2300/00; A01N 25/30; A01N 25/14; A01N 25/00; A61P 33/00; A61K 47/10

See application file for complete search history.

(56) References Cited

U.S. PATENT DOCUMENTS

| | | | |
|---|---|---|---|
| 2,367,155 | A | 1/1945 | Thompson |
| 3,452,931 | A | 7/1969 | Knowles |
| 3,516,608 | A | 6/1970 | Bowen et al. |
| 3,991,213 | A | 11/1976 | Mitsubayashi |
| 4,677,117 | A | 6/1987 | Haus |
| 4,803,289 | A | 2/1989 | Laurence et al. |
| 4,855,133 | A | 8/1989 | Kamei et al. |
| 4,925,657 | A | 5/1990 | Den Braber et al. |
| 4,970,068 | A | 11/1990 | Wilson et al. |
| 4,985,413 | A | 1/1991 | Kohama et al. |
| 5,698,210 | A | 12/1997 | Levy |
| 5,846,553 | A | 12/1998 | Levy |
| 5,858,384 | A | 1/1999 | Levy |
| 5,858,386 | A | 1/1999 | Levy |
| 5,885,606 | A | 3/1999 | Kawada |
| 5,928,634 | A | 7/1999 | Uick et al. |
| 5,968,540 | A | 10/1999 | Brenner et al. |
| 5,983,557 | A | 11/1999 | Perich et al. |
| 6,041,543 | A | 3/2000 | Howse |
| 6,054,141 | A | 4/2000 | Mayer et al. |
| 6,185,861 | B1 | 2/2001 | Perich et al. |
| 6,190,652 | B1 | 2/2001 | Pair et al. |
| 6,306,416 | B1 | 10/2001 | McKibben et al. |
| 6,316,017 | B1 | 11/2001 | McKibben et al. |
| 6,335,027 | B1 | 1/2002 | Levy |
| 6,337,078 | B1 | 1/2002 | Levy |
| 6,346,262 | B1 | 2/2002 | Levy |
| 6,350,461 | B1 | 2/2002 | Levy |
| 6,387,386 | B1 | 5/2002 | Levy |
| 6,389,740 | B2 | 5/2002 | Perich et al. |
| 6,391,328 | B1 | 5/2002 | Levy |
| 6,403,529 | B1 | 6/2002 | Wollenweber et al. |
| RE37,890 | E | 10/2002 | Levy |
| 6,585,990 | B1 | 7/2003 | Huang |

(Continued)

FOREIGN PATENT DOCUMENTS

| | | | |
|---|---|---|---|
| CA | 2656617 | A1 | 1/2008 |
| CN | 1227054 | A | 9/1999 |

(Continued)

OTHER PUBLICATIONS

Brazilian Patent Office Action and Search Report for Application No. BR112019016699-8 dated Dec. 29, 2020 (12 pages, English translation included).

(Continued)

*Primary Examiner* — Tracy Liu

(74) *Attorney, Agent, or Firm* — Michael Best & Friedrich LLP

(57) ABSTRACT

Disclosed are insecticidal compositions and associated methods that comprise an insecticide, $C_{2-4}$ alkylene carbonate, $C_{2-6}$ polyalkylene glycol, and a block co-polymer of $C_{2-5}$ polyalkylene glycol and $C_{3-6}$ polyalkylene glycol.

20 Claims, 12 Drawing Sheets

(56) References Cited

U.S. PATENT DOCUMENTS

| | | | |
|---|---|---|---|
| 6,599,539 | B1 | 7/2003 | Taylor |
| 6,638,994 | B2 | 10/2003 | Crooks et al. |
| 6,821,526 | B1 | 11/2004 | Huang |
| 6,916,469 | B2 | 7/2005 | Rojas et al. |
| 7,122,176 | B2 | 10/2006 | Stamets |
| 7,793,920 | B2 | 9/2010 | Bauer et al. |
| 7,914,777 | B2 | 3/2011 | Rojas et al. |
| 7,951,388 | B2 | 5/2011 | Stamets |
| 7,951,389 | B2 | 5/2011 | Stamets |
| 8,084,052 | B1 | 12/2011 | Mason et al. |
| 2001/0006685 | A1 | 7/2001 | Watanabe et al. |
| 2002/0146394 | A1 | 10/2002 | Stamets et al. |
| 2002/0147179 | A1 | 10/2002 | Munagavalasa et al. |
| 2003/0194454 | A1 | 10/2003 | Bessette et al. |
| 2003/0198659 | A1 | 10/2003 | Hoffmann et al. |
| 2006/0111403 | A1 | 5/2006 | Hughes et al. |
| 2006/0165746 | A1 | 7/2006 | Markus et al. |
| 2006/0233848 | A1 | 10/2006 | Patel et al. |
| 2007/0020304 | A1 | 1/2007 | Tamarkin et al. |
| 2007/0148204 | A1 | 6/2007 | Parker et al. |
| 2008/0118585 | A1 | 5/2008 | Nouvel |
| 2009/0010979 | A1 | 1/2009 | Baker et al. |
| 2009/0105073 | A1 | 4/2009 | Taranta et al. |
| 2009/0163582 | A1 | 6/2009 | Wang et al. |
| 2009/0181850 | A1 | 7/2009 | Stern et al. |
| 2009/0192040 | A1 | 7/2009 | Grobler |
| 2009/0263511 | A1 | 10/2009 | Shah et al. |
| 2009/0277074 | A1 | 11/2009 | Noronha et al. |
| 2009/0304624 | A1 | 12/2009 | Gutsmann et al. |
| 2010/0055084 | A1 | 3/2010 | Gutsche et al. |
| 2010/0158965 | A1 | 6/2010 | Beitzel et al. |
| 2010/0192451 | A1 | 8/2010 | Ponnusamy et al. |
| 2010/0192452 | A1 | 8/2010 | Kupfer et al. |
| 2010/0223837 | A1 | 9/2010 | Borth et al. |
| 2010/0247480 | A1 | 9/2010 | Kupfer et al. |
| 2010/0247684 | A1 | 9/2010 | Reid et al. |
| 2010/0322892 | A1 | 12/2010 | Burke |
| 2011/0053773 | A1 | 3/2011 | Armel et al. |
| 2011/0130430 | A1 | 6/2011 | Sonneck et al. |
| 2011/0152077 | A1 | 6/2011 | Ilg et al. |
| 2011/0184040 | A1 | 7/2011 | Taranta et al. |
| 2011/0200551 | A1 | 8/2011 | Stamets |
| 2011/0236451 | A1 | 9/2011 | Taranta et al. |
| 2012/0039976 | A1 | 2/2012 | Stamets |
| 2012/0128648 | A1 | 5/2012 | Kaushik |
| 2013/0005688 | A1 | 1/2013 | Saunders et al. |
| 2013/0067795 | A1 | 3/2013 | Wesson et al. |
| 2013/0079228 | A1 | 3/2013 | Freed |
| 2013/0101687 | A1 | 4/2013 | Willis et al. |
| 2014/0120186 | A1 | 5/2014 | Willis et al. |
| 2014/0121184 | A1 | 5/2014 | Willis et al. |
| 2014/0274693 | A1 | 9/2014 | Jadhav et al. |
| 2015/0216164 | A1 | 8/2015 | Bedoukian et al. |
| 2015/0305331 | A1 | 10/2015 | Gewehr |
| 2016/0051519 | A1 | 2/2016 | Soll et al. |
| 2017/0112126 | A1 | 4/2017 | Rettori et al. |
| 2018/0235230 | A1 | 8/2018 | Leroy Rene-Boisneuf et al. |

FOREIGN PATENT DOCUMENTS

| | | | |
|---|---|---|---|
| CN | 88105401 | A | 10/2009 |
| CN | 101558769 | A | 10/2009 |
| EP | 0446464 | A1 | 12/1990 |
| EP | 0933025 | A1 | 8/1999 |
| GB | 2446889 | A | 8/2008 |
| JP | H0753315 | A | 2/1995 |
| JP | H07277902 | A | 10/1995 |
| JP | H11-60421 | A | 3/1999 |
| JP | 4148552 | B2 | 10/1999 |
| JP | 2001199809 | A | 7/2001 |
| JP | 2005-075753 | A | 3/2005 |
| JP | 2010053129 | A | 3/2010 |
| RO | 111149 | B1 | 7/1996 |
| TW | 200932108 | A | 8/2009 |
| WO | WO1986004897 | A1 | 8/1986 |
| WO | WO1990000005 | A | 1/1990 |
| WO | WO1995024124 | A1 | 9/1995 |
| WO | WO1999023875 | A1 | 5/1999 |
| WO | WO1999037148 | A1 | 7/1999 |
| WO | WO2002028189 | A2 | 4/2002 |
| WO | WO2003055308 | A | 7/2003 |
| WO | WO2005015993 | A1 | 2/2005 |
| WO | WO2006031743 | A2 | 3/2006 |
| WO | WO2006111750 | A1 | 10/2006 |
| WO | WO2007085899 | A2 | 8/2007 |
| WO | WO2008057561 | A2 | 5/2008 |
| WO | WO2010127019 | A1 | 11/2010 |
| WO | WO2011038747 | A1 | 4/2011 |
| WO | WO2013010099 | A1 | 1/2013 |
| WO | WO2015008083 | A1 | 1/2015 |

OTHER PUBLICATIONS

Brazilian Patent Office Action and Search Report for Application No. BR122020020584-9 dated Dec. 29, 2020 (9 pages, statement of relevance included).

"Pyrethrins & Pyrethroids" 1998 Fact Sheet published by the National Pesticide Telecommunications Network (NPTN) at Oregon State University, Corvallis, Oregon.

Abbott "A method for computing the effectiveness of an insecticide," J Econ Entomol., 1925 18:265-267.

Allan, "Susceptibility of adult mosquitoes to insecticides in aqueous sucrose baits," Journal of Vector Ecology, 2011; 36:59-67.

Anderson et al., "Teflon® As A Surface For Deposition Of Aerosol Droplets," Mosq. News, 1971, 31: 499-504.

Bestmann et al., "Herbal Insecticides VIII1: Synergistic Activity of (−)-Carvone and Pyrethrin I in Essential Oil of *Chrysanthemum balsamita* L.", J. Appl. Ent., vol. 106, (1988), pp. 144-149.

Brown et al., "A comparison of Teflon® slides and the Army Insecticide Measuring System for sampling aerosol clouds," J Am Mosq Control Assoc., 1993, 9:32-35.

Carvone, National Institute of Standards and Technology, 2015 <http://webbook.nist.gov/cgi/cbook.cgi?ID=99-49-0 (2 pages).

Colby, "Calculating Synergistic and Antagonistic Responses of Herbicide Combinations", Weeds 1967, 15, 20-22.

Conagua, Comisión Nacional del Agua, "Disponible en línea," <http://www.gob.mx/conagua> 2013.

Dof, Diario Oficial de la Federación "Proyecto de Norma Oficial Mexicana PROY-NOM-032-SSA-2014, para la vigilancia epidemiológica, prevención y control de las enfermedades transmitidas por vector," 2015 México, DF. Available from: <http://dof.gob.mx/nota_detalle.php?codigo=5357366&fecha=22/08/2014> [accessed Jan. 18, 2015] 27 pages.

Durant, J., "Customs Rulings Online Search System", 2002, 4 pages.

EPA Office of Pesticide Programs Memorandum "Pyrethroids: Evaluation of Data from Developmental Neurotoxicity Studies and Consideration of Comparison Sensitivity" (Jan. 20, 2010).

Farajollahi, "An open-field efficacy trial using AquaDuet™ via an ultra-low volume cold aerosol sprayer against caged Aedes albopictus," J Am Mosq Control Assoc., 2013, 29(3):304-308.

Finney, "Estimation of the median effective dose," Probit analysis, 1971, Cambridge, Cambridge University Press, pp. 21-39.

Fundação Nacional Da Saúde, "Programa Nacional de Controle da Dengue (PNCD) "Ministério da Saude, 2002, Funsa. Brasília.

Hatem et al, "Synergistic activity of several acids in binary mixtures with synthetic insecticides on Spodoptera littoralis (Boisduval)", 2009, Boletin de Sanidad Vegetal, Plagas, vol. 35, pp. 533-542.

Hernandez-Avila et al., "Nation-wide, web-based, geographic information system for the integrated surveillance and control of dengue fever in Mexico," PLOS One, 2013, 8: e70231. doi: 10.1371/journal.pone.0070231 PMID: 23936394.

Hill "A novel plant-based synergist for pyrethrum and pyrethroids against urban public health pests", In: Proceedings of the sixth international conference on urban pests, (2008), pp. 235-237.

Inegi, Instituto Nacional de Estadística y Geografía, "Disponible en linea," <http://www.inegi.org.mx/> 2010.

(56) References Cited

OTHER PUBLICATIONS

Jansen et al, "Effects of organic-farming-compatible insecticides on four aphid natural enemy species", Pest Management Science (2010), vol. 66, No. 6, pp. 650-656.
Kerr, R. W., "Adjuvants for pyrethrins in fly sprays 1. The adjuvant action of some essential oils and other materials from Australian plants," CSIRO Bulletin 1951, No. 261, pp. 7-31.
Krenick. F. 2016. Determine Adulticide (ULV) Spread Factors on Teflon—coated Slides. Clarke Global Support Department S.O.P. #: B006, 1-4.
Kuno, "Early history of laboratory breeding of Aedes aegypti (Diptera: Culicidae) focusing on the origins and use of selected strains," Journal of Medical Entomology 47: 957-971. 2010.
Linss et al., "Distribution and dissemination of the Val1016lle and Phe1534Cys Kdr mutations in Aedes aegypti Brazilian natural populations," Parasites & Vectors. v. 7. p. 25. 2014.
Lofgren et al., "Size Of Aerosol Droplets Impinging On Mosquitoes As Determined With A Scanning Electron Microscope," J Econ Entomol., 1973, 66:1085-1088.
Macoris et al., "2014. Impact of insecticide resistance on the field control of Aedes aegypti in the State of São Paulo," Rev. Soc. Bras. Med. Trop. 2014, 47(5): 573-578.
Macoris et al., "Association of insecticide use and alteration on Aedes aegypti susceptibility status," Mem. Inst. Oswaldo Cruz. v.102(8). p. 895-900. 2007.
Macoris MLG. Munerato Nos. Otrera VCG. Procedimento Operacional Padrão para a formação de colônias de Aedes aegypti. para o laboratório de Entomologia Aplicada da Superintendencia de Controle de Endemias. Marília: SUCEN; 2014.
Mansour, S. A. et al., "Botanical Biocides 4. Mosquitocidal activity of certain Thymus Capitatus constitutents," Journal of Natural Toxins 2000, vol. 9, No. 1, pp. 49-62.
Martin-Lopez et al, "Use of oils combined with low doses of insecticide for the control of Myzus persicae and PVY epidemics", Pest Management Science (2006), vol. 62, No. 4, pp. 372-378.
May et al., "The Impaction Of Aerosol Particles on Cylinders. Spheres. Ribbons And Discs," J Scientific Instruments, 1967, 10: 83-95.
Mickle. R. 2003. Slide Analysis Version 1.3. Available from: REMSpC Spray Consulting. http://remspc.com [accessed Jun. 15. 2015].
Mount & World Health Organization, "Ultra-low-volume application of insecticides for vector control," Geneva: World Health Organization, 1985, 31 pages.
Paho, Pan American Health Organization "Dengue regional information, Number of cases by year," 2014, <http://www.paho.org/hq/index.php?option=com_content&view=article&id=264&Itemid=363> Accessed Sep. 4, 2016.
Paho, Pan American Health Organization "Dengue regional information, number of cases by year," 2015 <http://www.fao.org/countryprofiles/index/es/?iso3=MEX> Accessed Sep. 4, 2016.
Pereira et al., "Monitoring of resistance to the pyrethroidcypermethrin in Brazilian Aedes aegypti (Diptera:Culicidae) populations collected between 2001and 2003," Mem. Inst. Oswaldo Cruz. Rio de Janeiro, 2005, 100(4) p. 441-444.
Raymond, "Presentation d'une programme d'analyse log-probit pour microordinateur cahiers," Orstrom. ser Ent Med Parasitol., 1985; 23(2):117-21.
Rezende. MG; Calderon. G.F; Macoris. MLG; Andrighetti. MTM; Takaku. Instruções para bioensaios para avaliação de aplicações espaciais de inseticidas.Epidemiologia e Serviços de Saúde; v (3). p. 189-194. 2004.
Riley et al., "Description and validation of a test system to investigate the evaporation of spray droplets", Pesticide Formulations and Application Systems: 14th Volume ASTM STP 1234, Franklin R. Hall, Paul D. Berger and Herbert M. Collins, Eds., American Society for Testing and Materials, Philadelphia, 1995, 225-236.
Secretaria De Estado Da Saúde. Superintendência de Controle de Endemias-Sucen-Relatório anual. Programa de Monitoramento da susceptibilidade de Aedes aegypti a inseticidas. 2015. Mimeo 15p.

Secretaria De Vigilância Em Saúde—Ministério da Saúde. Boletim Epidemiologico V.47. No. 18, 2016, 10p.
Secretaria De Vigilancia Em Saúde. Ministério da saúde. Plano Nacional de enfrentamento à microcefalia. Available at:http://portalsaude.saude.gov.br/images/campanhas/dengue2015/Broadside_Microcefalia_20x28_V2.pdf. Access in May 5, 2016.
Smitt, O., "Syntheses of Allelochemicals for Insect Control" (2002), Mid Sweden University, 58 pages.
SUIVE/DGE Secretaría de Salud de México. 2016. Boletín epidemiológico. Información Epidemiológica de Morbilidad, http://www.epidemiologia.salud.gob.mx/doctos/boletin/2016/BOL_EPID_2016-SE33.pdf (accessed on Apr. 2016) 68 pages.
Suman et al., "Efficacy of DUET™ dual-action adulticide against caged Aedes albopictus with the use of an ultra-low volume cold aerosol sprayer," J Am Mosq Control Assoc., 2012, 28:338-340.
Superintendência De Controle De Endemias Sucen—1992. Secretaria de Estado da Saúde. Diretoria de Combate a Vetores. Manual de Controle dos Vetores de Dengue e Febre Amarela Nebulizações. São Paulo. 30p.
Teske et al., "Initial Laboratory Measurements of the Evaporation Rate of Droplets Inside a Spray Cloud," Transactions of the ASABE, 2016, vol. 59(2): 487-493.
Torres-Galicia et al., Dengue n Mexico: analisis de dos decadas Gaceta Medica de Mexico. 2014; 150:122-7.
United States Environmental Protection Agency, "Pesticide Registration Manual: Chapter 2—Registering a Pesticide Product," retrieved from <https://www.epa.gov/pesticide-registration/pesticide-registration-manual-chapter-2-registering-pesticide-product> Mar. 27, 2019, 24 pages.
Valent, "Material Safety Data Sheet," Valent Bio Sciences Corporation, dated Aug. 23, 2007.
World Health Organization 2003, "Space spray application of insecticides for vector and public health pest control. A practioner's guide," WHO/CDS/WHOPES/2003.5. 43p.
World Health Organization 2006, "Pesticides and their application for the control of vectors and pests of public health importance," Department of Control of Neglected Tropical Diseases, Pesticide Evaluation Scheme, 6th ed., WHO/CDS/NTD/WHOPES/GCDPP/2006.1. 125p.
World Health Organization 2009, "Guidelines for efficacy testing of insecticides for indoor and outdoor ground-applied space spray applications," WHO/HTWNTD/WHOPES/2009.2. 53p.
Yang, et al., "Adulticidal Activity of Five Essential Oils against Culex pipiens quinquefasciatus," J. Pestic. Sci. 30 (2), 84-89, 2005.
Graham et al., "Novel Synthesis: Imidacloprid CYP450 Pesticide Synergist from Dill Lowers Surface Runoff Toxicity", Canadian Young Scientist Journal, May 2011, vol. 2011, Issue 2, p. 21-26.
Australian Patent Office Examination Report for Application No. 2019216585 dated Apr. 9, 2020 (12 pages).
International Search Report and Written Opinion for Application No. PCT/US2018/017881 dated Apr. 13, 2018, 14 pages.
PCT/US2012/46718 International Search Report dated Dec. 7, 2012 (10 pages).
United States Patent Office Action for U.S. Appl. No. 13/175,405 dated Dec. 24, 2014 (11 pages).
United States Patent Office Action for U.S. Appl. No. 13/175,405 dated Feb. 24, 2014 (11 pages).
United States Patent Office Action for U.S. Appl. No. 14/149,507 dated Mar. 13, 2015 (12 pages).
United States Patent Office Action for U.S. Appl. No. 14/149,513 dated Sep. 21, 2015 (15 pages).
United States Patent Office Action for U.S. Appl. No. 14/748,933 dated Aug. 22, 2019 (11 pages).
United States Patent Office Action for U.S. Appl. No. 14/748,933 dated Dec. 31, 2018 (11 pages).
United States Patent Office Action for U.S. Appl. No. 14/748,933 dated Mar. 9, 2018 (11 pages).
Mexican Patent Office Action for Application No. MX/a/2019/009685 dated Jan. 28, 2021 (8 pages, English translation included).

INSECTICIDAL COMPOSITION

FIELD

The disclosure relates to compositions and methods useful for insect control.

BACKGROUND

Treatment of adult mosquitoes is an important defense against mosquito-borne illnesses. Typically, adult mosquito populations are controlled with application of pesticides. One common technique uses Ultra Low Volume (ULV) technology, sometimes referred to as cold fogging. The pesticide is applied with specialized spray equipment mounted in aircraft, on the back of trucks, or even carried by hand. With this technique, aerosols are released to drift through a target zone. Chemical concentrates most often are used, and even if diluted, volumes of material used remain low. It is desired for the aerosol to persist in the air column for an appreciable length of time at suitable droplet densities to contact the flying mosquito and is generally only effective while the droplets remain airborne.

Thus, it is desirable to have an insecticidal composition which has the physical properties necessary to provide efficacy against adult mosquitos via aerial application or ground application. Further, given the increased awareness of the toxicity of certain substances, such compositions containing insecticides are especially valuable to the extent they include common non-toxic organic substances as carriers or additives to facilitate the use of the composition in the field.

SUMMARY

Embodiments of the present disclosure relate to an insecticidal composition. In accordance with these embodiments, the composition includes at least one insecticide, a polyalkylene block copolymer wetting agent, a polyalkylene carbonate, and a polyalkylene glycol; wherein, presence of the wetting agent in the insecticidal composition increases insect mortality as compared to an insecticidal composition lacking the wetting agent.

Embodiments of the present disclosure also provide a method for insect control. In accordance with these embodiments, the method includes contacting a population of insects with a composition including at least one insecticide, a polyalkylene block copolymer wetting agent, a polyalkylene carbonate, and a polyalkylene glycolthe;
wherein, contacting the population of insects with the composition increases insect mortality as compared to an insecticidal composition lacking the wetting agent.

In some embodiments, the disclosure relates to a composition comprising an insecticide, $C_{2-4}$ alkylene carbonate, $C_{2-6}$ polyalkylene glycol, and a block co-polymer of $C_{2-5}$ polyalkylene glycol and $C_{3-6}$ polyalkylene glycol. In some embodiments, the composition further comprises 1-carvone and/or piperonyl butoxide. In some embodiments, the composition comprises more than one insecticide. In some embodiments, the composition comprises from about 15 to about 40 percent by weight of $C_{2-4}$ alkylene carbonate. In some embodiments, the composition comprises from about 29 to about 75 percent by weight of a polyethylene glycol. In some embodiments, the composition comprises about 2.5 to about 20 percent by weight of a block copolymer of polyethylene glycol and polypropylene glycol.

The disclosure provides for other aspects and embodiments that will be apparent in light of the following detailed description.

BRIEF DESCRIPTION OF THE DRAWINGS

FIG. 2A includes the cumulative volume fraction curves for insecticidal formulations sprayed through a Micronair AU5000 spinning at either 8000 or 10000 rpm. FIG. 2B is a representative graph of the relationship between flow variation and volume median diameter of insecticidal formulations at the two sprayer speeds tested.

In FIGS. 3A-3B, droplets of insecticidal formulations suspended on spruce budworm webbing wound across a wire supporting structure were monitored over time for evaporation under controlled temperature and humidity settings. The starting image is shown in FIG. 3A, and the final image is shown in FIG. 3B. The ratios of the drop diameters are plotted as a function of time for two different temperatures tested in FIG. 3C. Corresponding evaporation curves are shown in FIG. 3D. To calculate an evaporation rate, the data is graphed as shown in FIG. 3E. FIG. 3F includes wet bulb depression curves for various temperature and humidity conditions of an insecticidal formulation, and FIG. 3G includes wet bulb depression curves comparing time to evaporation and various droplet sizes of an insecticidal formulation.

FIG. 4A includes data from a dosing study where 25 *Aedes aegypti* were dosed with one of five different concentrations of insecticidal formulations. FIG. 4B includes data of the total number of drops produced at two different atomizer speeds. Solid lines in FIG. 4C represent the number of drops emitted per meter of flight line for insecticidal formulations VVID ranges near 35 μm (10000 rpm) or 50 μm (8000 rpm). Drop diameters containing maximal lethal doses of the insecticidal formulations are shown with dashed lines for both 35 μm and 50 μm concentrations.

DETAILED DESCRIPTION

Figure 1:
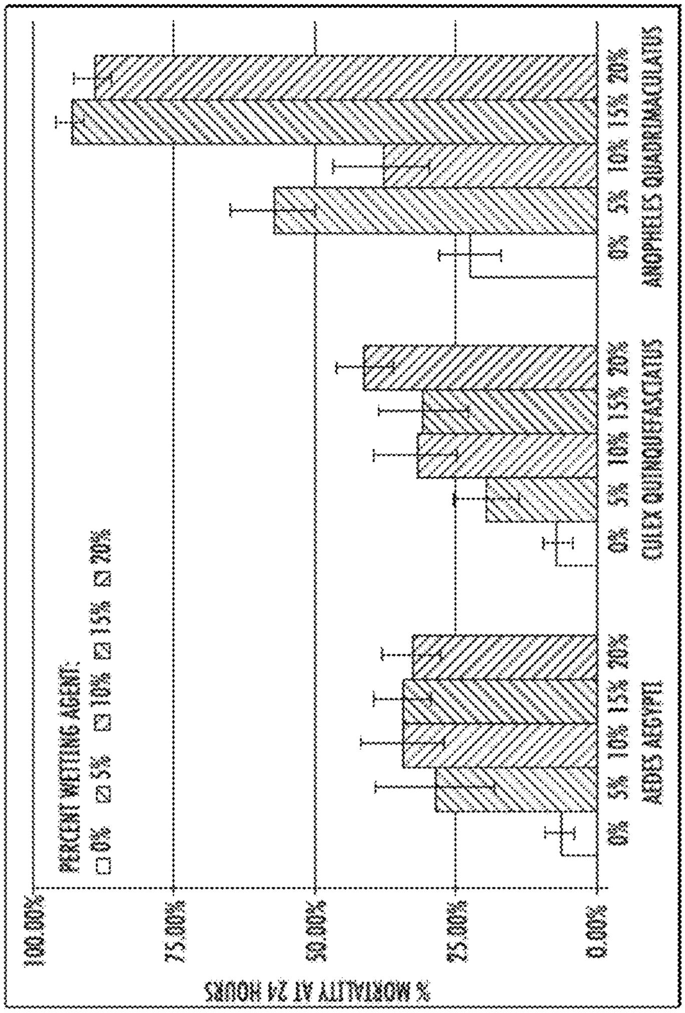
FIG. 1 includes representative data from an analysis of the efficacy of insecticide formulations containing varying amounts (% wt) of wetting agent(s).

Embodiments of the present disclosure relate generally to insecticidal compositions and associated methods that are effective against insects, such as mosquitoes. Insecticidal compositions of the present disclosure pose little toxicology risk to plants and/or animals. The compositions can also be environmentally "green" as various components can be selected from compounds that have comparably less environmental impact.

In an aspect, the present disclosure provides a composition which has a suitable physical profile and is effective against various species of mosquitoes whether applied aerially or via ground ULV applications. In an aspect, it is desirable for the composition to persist in the air column for an appreciable length of time at suitable droplet densities to contact the flying mosquito. Characteristics that affect the desired profile include, but are not limited to, non-volatile fraction, density and evaporation rate.

In an aspect, the present disclosure provides a composition with a density of from about 1.0 g/mL to about 1.2 g/mL. In an aspect, the present disclosure provides a composition with an evaporation rate of less than about 2 $\mu m^2 s^{-1}$° C. In an aspect, the present disclosure provides a composition with a non-volatile fraction of more than about 50% weight percent. The desired density and/or evaporation rate may be obtained using a suitable combination of inert ingredients.

Chemistry of Pyrethrin Esters and Pyrethroids

The United States Environmental Protection Agency (the EPA) uses the terms "pyrethrum," "pyrethrins," and "pyrethroids" as follows:

"Pyrethrum" is a crude extract (and mixture of substances) derived from chrysanthemum flowers. It possesses insecticidal properties. Although no end-use products containing pyrethrum are currently registered with the EPA, the compositions described herein include embodiments using pyrethrum.

Refined pyrethrum is called "pyrethrins." This refinement is intended to further isolate the insecticidal components of pyrethrum. The EPA regulates pyrethrins as one active ingredient; however, this refined extract contains a mixture of six pyrethrin esters. For example, the active ingredient in the Manufacturing Use Product (MUP) described below is what the EPA describes as "pyrethrins." When analyzed using High Performance Liquid Chromatography the active ingredient is a mixture of Pyrethrins I and Pyrethrins II.

"Pyrethroids" are compounds synthesized to mimic the structure of pyrethrins, for example, to increase photostability and to enhance insecticidal activity. Pyrethroids are structurally similar to naturally occurring pyrethrin esters and act in a similar manner to pyrethrins.

As used herein, the term "pyrethrum" refers to a crude extract composition that is derived from chrysanthemum-like flowers primarily grown in Kenya, Tanzania, and Australia (e.g., *T. cinerariaefolium, C. cinerariaefolium*, and *C. coccineum*), and comprises a mixture of the naturally occurring insecticidal ester compounds known as the "pyrethrins." "Pyrethrins" is used herein as a collective term given to any combination of the six ester compounds (including refined pyrethrum) having the general Formula (I) and detailed in Table 1:

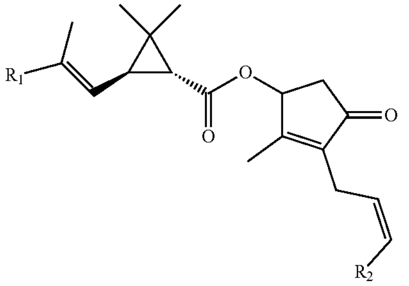

(I)

TABLE 1

| Naturally Occurring Pyrethrin Esters | | | |
|---|---|---|---|
| Common Name | CAS No. | $R_1$ | $R_2$ |
| Pyrethrins I | | | |
| Jasmolin-I | 4466-14-2 | $CH_3$ | $CH_2CH_3$ |
| Cinerin-I | 25402-06-6 | $CH_3$ | $CH_3$ |
| Pyrethrin-I | 121-21-1 | $CH_3$ | $CH{=}CH_2$ |
| Pyrethrins II | | | |
| Jasmolin II | 1172-63-0 | $CH_3OC(O)$ | $CH_2CH_3$ |
| Cinerin II | 121-20-0 | $CH_3OC(O)$ | $CH_3$ |
| Pyrethrin II | 121-29-9 | $CH_3OC(O)$ | $CH{=}CH_2$ |

The term "pyrethrin ester" or "pyrethrin" is used herein to refer to one or a combination of two or more of the naturally occurring compounds defined in Table 1.

While the terms "pyrethrins" and "pyrethrum" are sometimes used interchangeably, "pyrethrum" should be understood here to encompass crude extracts that contain pyrethrins. The pyrethrins in any given pyrethrum extract vary in relative amount, depending on factors such as the plant variety, where it is grown, and the time of harvest.

Because it is not currently commercially advantageous to separate and isolate individual pyrethrin esters from each other, the pyrethrins content in pyrethrum extract is typically analyzed for total content of pyrethrins. While variable, the current state of the art typically allows for the total pyrethrins (e.g., pyrethrins I and pyrethrins II) to constitute about 45 to 55% (by weight) of a pyrethrum extract. Besides the pesticidially active esters mentioned above, many plant constituents may be present in the pyrethrum extract. This extract is typically a high boiling, viscous liquid that is prone to oxidation in air, might be difficult to store for extended periods of time, and can be readily diluted in a vegetable-based oil carrier to provide a Manufacturing Use Product (MUP) containing about 20% pyrethrins. This provides for a longer shelf life and has the added advantage of being NOSB (National Organic Standards Board) compliant. Therefore, pyrethrins are approved for use in organic production operations. Pyrethrins are commercially available from several sources throughout the world and, in the United States, are available from several sources including the product sold under the trade name Pyganic MUP 20 by MGK (Minneapolis, MN). Pyganic MUP 20 contains about 20% pyrethrins by weight. When the term "MUP 20" is used herein it refers to a MUP comprising about 20% pyrethrins by weight and includes, but is not limited to, Pyganic MUP 20.

The term "pyrethroid" is understood in the art to mean one or more synthetic compounds that act as an insecticide and are adapted from the chemical structure of Formula (I). The EPA has established two general classes of pyrethroids. Pyrethroids that include an α-cyano group (C—CN) bonded to the ester oxygen (see Formula (I)) are referred to as Type II pyrethroids, while pyrethroids lacking an α-cyano group are referred to as Type I pyrethroids. See, e.g., EPA Office of Pesticide Programs Memorandum "Pyrethroids: Evaluation of Data from Developmental Neurotoxicity Studies and Consideration of Comparison Sensitivity" (Jan. 20, 2010). Non-limiting examples of pyrethroids include acrinathrin, allethrin, benfluthrin, benzylnorthrin, bioallethrin, bioethanomethrin, bioresmethrin, bifenthrin, cyclethin, cycloprothrin, cyfluthrin, beta-cyfluthrin, gamma-cyhalothrin, lamdba-cyhalothrin, cypermethrin, alpha-cypermethrin, beta-cypermethrin, zeta-cypermethrin, cyphenothrin, deltamethrin, empenthrin, esbiothrin, esfenvalerate, etofenprox, fenfluthrin, fenpropathrin, fenvalerate, flucythrinate, flumethrin, imiprothin, isopyrethrin I, kadethrin, metofluthrin, permethrin, IRS cis-permethrin, phenothrin, prallethrin, resmethrin, silafluofen, sumithrin (d-phenothrin), tau-fluvalinate, tefluthrin, tetramethrin, tralomethrin, transfluthrin, and isomers of these compounds.

Additional information regarding pyrethrum, pyrethrins, and pyrethroids can be found in various references, reviews, and fact sheets, for example, *Pyrethrum Flowers: Production, Chemistry, Toxicology, and Uses*. John E. Casida and Gary B. Quistad (eds.), Oxford University Press, 1995, and "Pyrethrins & Pyrethroids" 1998 Fact Sheet published by the National Pesticide Telecommunications Network (NPTN) at Oregon State University, Corvallis, Oregon.

Neonicotinoids are insecticides that act on the central nervous system of insects. Neonicotinoids include, but are not limited to, acetamiprid, clothianidin, dinotefuran, imidacloprid, nitenpyram, thiacloprid, and thiamethoxam.

Carbamates are organic compounds derived from carbamic acid ($NH_2COOH$) and feature the carbamate ester functional group. Carbamates include, but are not limited to, aldicarb, alanycarb, bendiocarb, benfuracarb, butocarboxim, butoxycarboxim, carbaryl, carbofuran, carbosulfan, ethiofencarb, fenobucarb, formetanate, furathiocarb, isoprocarb, methiocarb, methomyl, metolcarb, oxamyl, pirimicarb, propoxur, thiodicarb, thiofanox, trimethacarb, XMC, xylylcarb, and triazamate.

Organophosphates are esters of phosphoric acid which act on the enzyme acetylcholinesterase. Organophosphates include, but are not limited to, acephate, azamethiphos, azinphos-ethyl, azinphos-methyl, chlorethoxyfos, chlorfenvinphos, chlormephos, chlorpyrifos, methyl chlorpyrifos, coumaphos, cyanophos, demeton-S-methyl, diazinon, dichlorvos/DDVP, dicrotophos, dimethoate, dimethylvinphos, disulfoton, EPN, ethion, ethoprophos, famphur, fenamiphos, fenitrothion, fenthion, flupyrazophos, fosthiazate, heptenophos, isoxathion, malathion, mecarbam, methamidophos, methidathion, mevinphos, monocrotophos, omethoate, oxydemeton-methyl, parathion, methyl parathion, phenthoate, phorate, phosalone, phosmet, phosphamidon, phoxim, pirimiphos-methyl, profenofos, propetamphos, prothiofos, pyraclofos, pyridaphenthion, quinalphos, sulfotep, tebupirimfos, temephos, terbufos, tetrachlorvinphos, thiometon, triazophos, trichlorfon, and vamidothion.

Organochlorines are organic compounds containing at least one covalently bonded chlorine atom. Organochlorines include, but are not limited to, phthalimides, sulfamides, and chloronitriles, including, but not limited to, anilazine, captan, chlorothalonil, captafol, chlordane, dichlorodiphenyltrichloroethane (DDT), dicofol, dichlofluanid, dichlorophen, endosulfan, flusulfamide, folpet, hexachlorobenzene, heptachlor, pentachlorphenol and its salts, aldrin, dieldrin, endrin, mirex, phthalide, and tolylfluanid, N-(4-chloro-2-nitro-phenyl)-N-ethyl-4-methyl-benzenesulfonamide.

Sulfoximines are insecticides that act as nicotinic acetylcholine receptor competitive modulators. Sulfoximines include, but are not limited to, sulfoxaflor.

"Mosquito" is understood to refer to any specie of the 3,500 species of the insect that is commonly associated with and given the common name "mosquito." Mosquitoes span 41 insect genera, including the non-limiting examples of *Aedes, Culex, Anopheles* (carrier of malaria), Coquillettidia, and Ochlerotatus.

Compositions

Aspects of the disclosure provide a composition comprising an insecticide, $C_{2-4}$ alkylene carbonate, $C_{2-6}$ polyalkylene glycol, and a block copolymer of $C_{2-3}$ polyalkylene glycol and $C_{3-6}$ polyalkylene glycol. In some embodiments, the composition further comprises carvone (e.g., L-carvone) and/or piperonyl butoxide. In some embodiments, the composition comprises more than one insecticide. In some embodiments, the composition excludes the presence of a synergist.

In exemplary embodiments of these aspects, the disclosure provides a composition comprising, consisting essentially of, or consisting of, an insecticide, $C_{2-4}$ alkylene carbonate, $C_{2-6}$ polyalkylene glycol, and a block copolymer of $C_{2-3}$ polyalkylene glycol and $C_{3-6}$ polyalkylene glycol.

In exemplary embodiments, the present disclosure provides a composition with a density of from about 1.0 g/mL to about 1.2 g/mL.

In exemplary embodiments, the present disclosure provides a composition with an evaporation rate of less than about 2 $\mu m^2 \cdot s^{-1} \cdot °$ C., or less than about 1.5 $\mu m^2 \cdot s^{-1} \cdot °$ C., or less than about 1.0 $\mu m^2 \cdot s^{-1} \cdot °$ C., or less than about 0.5 $\mu m^2 \cdot s^{-1} \cdot °$ C. In exemplary embodiments, the present disclosure provides a composition with an evaporation rate of more than about 0.5 $\mu m^2 \cdot s^{-1} \cdot °$ C., or more than about 1.0 $\mu m^2 \cdot s^{-1} \cdot °$ C., or more than about 1.5 $\mu m^2 \cdot s^{-1} \cdot °$ C.

In exemplary embodiments, the present disclosure provides a composition with a non-volatile fraction of more than about 50 weight %, or more than about 60 weight %, or more than about 75 weight %, or more than about 80 weight %. In exemplary embodiments, the present disclosure provides a composition with a non-volatile fraction of less than about 100 weight %, or less than about 90 weight %, or less than about 75 weight %, or less than about 60 weight %. In exemplary embodiments, the non-volatile fraction is about 50 weight % to about 100 weight %.

The total amount of insecticide in the compositions can be present at less than about 10 percent by weight, less than about 8 percent by weight, less than about 5 percent by weight or in other amounts as described in this specification and can comprise one or more of a pyrethrin, pyrethroid, sulfoxaflor, neonicotinoid, chlofenapyr, ethiprole, carbamate, organophosphate, or organochlorine or combinations thereof. Examples of pyrethrins include one or more of jasmolin-I, cinerin-I, pyrethrin-I, jasmolin-II, cinerin-II, or pyrethrin-II. Examples of pyrethroid include one or more of etofenprox, permethrin, prallethrin, resmethrin, sumithrin, allethrin, alpha-cypermethrin, bifenthrin, beta-cypermethrin, cyfluthrin, cypermethrin, deltamethrin, esfenvalerate, lamdba-cyhalothrin, or zeta-cypermethrin. Examples of neonicotinoids include one or more of dinotefuran, acetamiprid, clothianidin, imidacloprid, nitenpyram, thiacloprid, or thiamethoxam. In exemplary embodiments, the composition can be substantially free of piperonyl butoxide, N-octyl bicycloheptene dicarboximide, or both.

In some embodiments, the insecticide includes, but is not limited to, pyrethrum, pyrethrins, pyrethroids, neonicotinoids, sulfoximines, carbamates, organophosphates, and organochlorines or combinations thereof. In exemplary embodiments, the composition according to the present disclosure comprises a pyrethroid in combination with a second insecticide. The pyrethroid (e.g., prallethrin) may be present in an amount of at least about 0.5% by weight, at least about 0.75% by weight, or at least about 1.0% by weight, or at least about 1.5% by weight, or at least about 2.0% by weight. The pyrethroid may be present in an amount of no more than about 2.0% by weight, no more than about 1.5% by weight, no more than about 1.0% by weight, no more than about 0.75% by weight, or no more than about 0.5% by weight.

In exemplary embodiments, the composition according to the present disclosure may comprise a second insecticide. The second insecticide may be a neonicotinoid, such as imidacloprid, or a pyrethroid, such as sumithrin. In exemplary embodiments, the second insecticide may be present in an amount of at least about 2.5% by weight, at least about 3.0% by weight, or at least about 5.0% by weight. In exemplary embodiments, the second insecticide may be present in an amount of no more than about 5.0% by weight, no more than about 3.0% by weight, or no more than about 2.5% by weight.

The amount of the one or more insecticides in the composition can range broadly and can depend on the particular agent as well as the intended use of the composition (e.g., based on method of application and/or particular target insect). While the amount of insecticide can range broadly, for a composition to be registered and marketed as a “pesticide” within the United States for some uses (e.g., public health uses and pest control in residential structures) the EPA requires that a composition exhibit a 95% insect mortality at the lowest labeled rate. The EPA also regulates the upper limits of active agent(s) that can be used in practice in the environment. For example, prallethrin is permitted at 0.00072 lbs/acre. Thus, in some embodiments, the compositions provided herein comprise an amount (e.g., weight %) of insecticides(s) in a range that allows for at least some degree of insecticidal efficacy when the composition is used, while not necessarily meeting the EPA requirements for an insecticide for certain uses (i.e., more than 0%, but less than 95% insect mortality rate). In some embodiments, the amount (e.g., weight %) of the insecticide in the composition meets or exceeds the EPA requirements for an insecticide suitable for certain uses and in certain applications (e.g., sold as a concentrate or ready-to-use product).

One skilled in the art can select an appropriate amount of the insecticide depending on the type of insect as well as the particular method of application. In exemplary embodiments, an amount of the insecticide can be selected such that the composition balances the insecticidal efficacy with the cost of the insecticide as well as balance risk of undesirable side effects (e.g., animal (fish or mammal) toxicity and/or environmental impact).

In some embodiments, the total amount of insecticide in the formulation is at least about 2.5% by weight, at least about 3.0% by weight, at least about 3.5% by weight, at least about 4.0% by weight, at least about 5.0% by weight, at least about 6.0% by weight, or at least about 7.5% by weight. In other embodiments, the total amount of insecticide in the formulation is no more than about 10.0% by weight, no more than about 7.5% by weight, no more than about 6.0% by weight, no more than about 5.0% by weight, or no more than about 4.0% by weight. In some embodiments, the total amount of insecticide in the formulation is about 2.5% by weight to about 10% by weight.

In some embodiments, the composition comprises from about 15 to about 40 percent by weight of $C_{2-4}$ alkylene carbonate. In some embodiments, the compositions comprises at least about 15% by weight of $C_{2-4}$ alkylene carbonate, or at least about 20% by weight, or at least about 25% by weight, or at least about 30% by weight, or at least about 35% by weight. In some embodiments, the compositions comprises no more than about 40% by weight of $C_{2-4}$ alkylene carbonate, no more than about 35% by weight, or no more than about 30% by weight, or no more than about 25% by weight. In accordance with these embodiments, the $C_{2-4}$ alkylene carbonate can include propylene carbonate.

In some embodiments, the composition comprises from about 29 to about 75 percent by weight of $C_{2-6}$ polyalkylene glycol, such as polyethylene glycol (e.g., PEG200-600, PEG400, or polypropylene glycol). In exemplary embodiments, the compositions comprises at least about 29% by weight of $C_{2-6}$ polyalkylene glycol, or at least about 35% by weight, or at least about 40% by weight, or at least about 45% by weight, or at least about 50% by weight, or at least about 55% by weight, or at least about 60% by weight, at least about 65% by weight, or at least about 70% by weight. In exemplary embodiments, the compositions comprises no more than about 75% by weight $C_{2-6}$ polyalkylene glycol, or no more than about 70% by weight, or no more than about 65% by weight, or no more than about 60% by weight, or no more than about 55% by weight, or no more than about 50% by weight, or no more than about 45% by weight, or no more than about 40% by weight, or no more than about 35% by weight.

In some embodiments, the composition comprises about 2.5 to about 20 percent by weight of a block copolymer of $C_{2-3}$ polyalkylene glycol and $C_{3-6}$ polyalkylene glycol. In exemplary embodiments, the block copolymer is a copolymer of polyethylene glycol and polypropylene glycol. In exemplary embodiments, the composition comprises at least about 2.5% by weight of the block copolymer, or at least about 5% by weight, or at least about 7.5% by weight, or at least about 10% by weight, or at least about 15% by weight. In exemplary embodiments, the composition comprises no more than about 20% by weight of the block copolymer, or no more than about 15% by weight, or no more than about 10% by weight, or no more than about 7.5% by weight, or no more than about 5% by weight.

The present disclosure provides insecticidal compositions that can include wetting agents. In some embodiments, compounds such as the block copolymers described herein (e.g., polyalkylene block copolymers) can act as wetting agents. Embodiments of the present disclosure demonstrate that the inclusion of a wetting agent(s) in the insecticidal formulations of the present disclosure enhances efficacy of the insecticidal compositions. The inclusion of the wetting agents(s) increased percent mortality in three different mosquito species (*Aedes aegypti, Culex quinquefasciatus*, and *Anopheles quadimaculatus*), as compared to insecticidal compositions that lack the wetting agent(s) (see, e.g., FIG. 1). Although the effect of the wetting agent(s) is clear, the mechanisms by which insect mortality is increased are somewhat unpredictable, as demonstrated by the species-specific variation in percent mortality, as well as the generally non-linear relationship between percent mortality and the concentration of the wetting agent(s).

Although wetting agents are known to have various properties or characteristics, such as the ability to lower the surface tension between two components of a liquid composition. But in addition to these known properties, wetting agent(s) of the present disclosure improve efficacy of an insecticidal composition. Without limiting the scope of this disclosure or being bound to a particular theory, this improvement might arise through different mechanisms. For example, the improved efficacy might occur because the wetting agent enhances penetration of an insecticide though an insect cuticle. In some cases, the inclusion of wetting agent(s) as described in the present disclosure in an insecticidal composition might provide an additional route of entry for the insecticide by facilitating the absorption or penetration of the insecticide though the insect cuticle, thus maximizing insect mortality over a given exposure time. Providing multiple routes of entry of an insecticide into an insect might lead to mortality (i.e., lethal dose) more quickly and efficiently than a single route of entry.

For example, polyalkylene block copolymers as described herein can be used as wetting agents in the various insecticidal compositions of the present disclosure (see Example 5 below). Use of polyalkylene block copolymers as wetting agents as described in the present disclosure leads to an unexpected increase in insecticidal delivery efficiency by increasing the penetration properties of the insecticide through the insect cuticle and providing multiple routes of entry for the insecticide. In other words, liquid insecticidal formulations that include a wetting agent(s) can be applied directly to various indoor and outdoor surfaces. Mosquitos that come into contact with these treated surfaces will be exposed to the insecticide, and percent mortality will likely increase over a given exposure time. In some cases, the inclusion of a wetting agent(s) can allow for the use of a lower effective concentration of the insecticide, as compared to a formulation without a wetting agent (regardless of delivery method). The use of lower effective concentrations of the insecticide can reduce cost and increase safety of the insecticidal formulations. Various other wetting agents can be used in the insecticidal compositions described herein, in addition or as an alternative to, polyalkylene block copolymers.

In some embodiments, the composition can include one or more carriers and/or diluents in addition such as, for example, any solid or liquid carrier or diluent that is commonly used in pesticidal, insecticidal, agricultural or horticultural compositions. Any included additional carrier or diluent will not reduce the insecticidal efficacy of the composition, relative to the efficacy of the composition in the absence of the additional component. The additional carrier or diluent will not affect the physical characteristics of the composition such that the composition no longer has the desired physical profile. Carriers and diluents can include, for example, solvents (e.g., water, alcohols, acids, and esters); vegetable and/or plant-based oils as well as ester derivatives thereof (e.g., wintergreen oil, cedarwood oil, rosemary oil, peppermint oil, geraniol, rose oil, palmarosa oil, citronella oil, citrus oils (e.g., lemon, lime, and orange), dillweed oil, corn oil, sesame oil, cottonseed oil, safflower oil, wheat germ oil, pine oil, cormint oil, soybean oil, palm oil, vegetable oil, olive oil, peanut oil, and canola oil). The composition can include varying amounts of other components such as, for example, surfactants (e.g., non-ionic, anionic, cationic, and zwitterionic surfactants); fatty acids and fatty acid esters (e.g., methyl palmitate/oleate/linoleate); and other auxiliary ingredients such as, for example, emulsifiers, dispersants, stabilizers, suspending agents, penetrants, coloring agents/dyes, and fragrances, as necessary or desired. Components other than the insecticide can be included in the compositions in any amount as long as the composition has some amount of insecticidal efficacy.

In exemplary embodiments, the composition according to the present disclosure may comprise:

| | | |
|---|---|---|
| CAS # 138261-41-3 (imidacloprid) | 3.00 | % Wt |
| CAS # 23031-36-9 (prallethrin) | 0.75 | % Wt |
| CAS # 6485-40-1 (l-carvone) | 5.00 | % Wt |
| CAS # 108-32-7 (propylene carbonate) | 40.00 | % Wt |
| CAS # 25322-68-3 (PEG 400) | 36.25 | % Wt |
| CAS # 9003-11-6 (PEG/PPG (n/n) Block Co-polymer | 15.00 | % Wt |

In exemplary embodiments, the composition according to the present disclosure may comprise.

| | | |
|---|---|---|
| CAS # 26002-80-2 (sumithrin) | 5.00 | % Wt |
| CAS # 23031-36-9 (prallethrin) | 1.00 | % Wt |
| CAS # 51-03-6 (piperonyl butoxide - PBO) | 5.00 | % Wt |
| CAS # 108-32-7 (propylene carbonate) | 25.00 | % Wt |
| CAS # 25322-68-3 (PEG 400) | 59.00 | % Wt |
| CAS # 9003-11-6 (PEG/PPG (n/n) Block Co-polymer) | 5.00 | % Wt |

Embodiments include commercially useful formulations or "ready-to-use" application forms. In such formulations, the composition can be provided as a mixture with other active compounds, for example, various additional insecticides, pesticides, fungicides, anti-microbials, and/or herbicides, as well as plant growth regulators, insect repellents, attractants, fertilizers, and/or fragrances, to expand the applicability of the insecticidal composition described herein. Embodiments provide for the compositions manufactured as formulations that are useful for mosquito control. In some embodiments, the composition can be formulated as an emulsion, a liquid concentrate, a sol (flowable agent), an aerosol (e.g., fogger), a liquid for ultra low volume (ULV) application, or the like, by any standard or conventional methods for mixing and manufacturing such formulations such as, for example, admixing an insecticide with $C_{2-4}$ alkylene carbonate, $C_{2-6}$ polyalkylene glycol, and a block copolymer of $C_{2-5}$ polyalkylene glycol and $C_{3-6}$ polyalkylene glycol, optionally with any suitable additional inert ingredient that is used as a carrier, solvent, diluent, emulsifier, dispersant, stabilizers suspending agent, or penetrant. The addition of these materials would depend on the active ingredient and the type of formulation and how it is intended to be applied.

In exemplary embodiments, the composition can be formulated for application or delivery as an aerosol or a fog wherein the composition allows for the formation of droplets having an average diameter of about 1 μm to about 30 μm. Suitable compositions for such a formulation typically should have a viscosity that allows for the composition to atomize, but not be so thick as to clog the nozzle. Such viscosities can vary and be readily determined by one of skill in the art; however, a non-limiting common minimum viscosity is about 1 centistokes (cts).

In some embodiments, the formulation comprises a concentration of insecticidal active compound or composition that is adequate for insecticidal activity when applied in a volume from about 0.3 to about 2.0 fluid ounces per acre such as in an ultra low volume (ULV) application.

In some embodiments, the composition can comprise one or more compounds that can increase the long-term stability of the insecticides in the composition. Thus, some embodiments may include an antioxidant to provide stabilization to oxidation and/or a UV light absorber to provide stabilization to light exposure. Such compounds are known in the art. Packaging and/or storage containers for the compositions described herein can be selected to provide protection from degradation of actives by oxygen and light exposure (e.g., vacuum packaging, inert atmosphere, deoxygenated solvents, and opaque/colored containers).

Methods

In an aspect, the disclosure provides a method for mosquito control comprising contacting a mosquito with an amount of any of the compositions herein described. In some embodiments, the method comprises contacting a mosquito with an amount of a composition comprising, consisting essentially of, or consisting of an insecticide, $C_{2-4}$ alkylene carbonate, $C_{2-6}$ polyalkylene glycol, and a block copolymer of $C_{2-5}$ polyalkylene glycol and $C_{3-6}$ polyalkylene glycol effective to knockdown about 95% of the contacted mosquito population. In some embodiments, the method comprises contacting a mosquito with an amount of a composition comprising, consisting essentially of, or consisting of an insecticide, a $C_{2-4}$ alkylene carbonate, a $C_{2-6}$ polyalkylene glycol, and a block copolymer of $C_{2-5}$ polyalkylene glycol and $C_{3-6}$ polyalkylene glycol effective to provide about 95% mosquito mortality within 24 hours at the lowest labeled rate (per EPA guideline).

In some embodiments, the methods described herein can comprise any known route, apparatus, and/or mechanism for the delivery or application of the compositions and formulations. In some embodiments, the method comprises a sprayer. Traditional pesticide sprayers in the pest control markets are typically operated manually or electrically or are gas-controlled and use maximum pressures ranging from 15 to 500 psi generating flow rates from 5 gpm to 40 gpm. In other embodiments, the methods disclosed herein comprise the use of the compositions and/or formulations in combination with any low volume environmental pest control device(s) such as, for example, ultra low volume (ULV) machines. Such combinations are useful in methods for mosquito control as well as other flying insects (e.g., flies, gnats, flying ants, sand fleas, and the like) wherein contacting the insect with a low volume of the composition is possible and/or desirable. ULV machines use low volume of material, for example, at rates of about one gallon per hour (or ounces per minute), and typically utilize artificial wind velocities such as from, for example, an air source (e.g., pump or compressor) to break down and distribute the composition/formulation into a cold fog (e.g., having average droplet particle sizes of about 1-30 μm). Any standard ground ULV equipment used for adult mosquito control such as, for example, a system including a (CETI) aerosol generator can be used in the methods described herein. A general ULV system includes a tank for the composition (e.g., insecticide), a transport system (e.g., a pump or pressurized tank), a flow control device, and a nozzle that atomizes the composition. Typically, ULV machines do not compress droplets. Rather, they often use a venture siphoning system, and can induce an artificial energizing of the droplets by adding an electrical current to the liquid (e.g., through the use an electrode located at the application tip. (See, e.g., U.S. Pat. No. 3,516,608 (Bowen, et al.) incorporated herein by reference.)

Methods for Making Compositions

The compositions can be generally prepared by any appropriate manufacturing processes and using any appropriate manufacturing equipment such as is known in the art. The compositions can be prepared by combining the various components in an appropriate vessel (considering vessel size, amount of composition to be made and reactivity of components) with mixing (e.g., stirring) until a uniform or homogeneous composition is achieved. The various composition components can be added sequentially, with stirring between each addition to ensure dissolution and/or dispersion of the previous component.

The use of the terms "a" and "an" and "the" and similar referents in the context of describing the subject matter of the present disclosure are to be construed to cover both the singular and the plural, unless otherwise indicated herein or clearly contradicted by context. The terms "comprising," "having," "including," and "containing" are to be construed as open-ended terms (i.e., meaning "including but not limited to") unless otherwise noted. All methods described herein can be performed in any suitable order unless otherwise indicated herein or otherwise clearly contradicted by context. The use of any and all examples, or exemplary language (e.g., "such as") provided herein, is intended merely to illustrate aspects and embodiments of the disclosure and does not limit the scope of the claims.

EXAMPLES

Materials and Methods

Reagents. Sumithrin and Prallethrin were supplied by MGK (Minneapolis, MN). Imidacloprid was supplied by United Phosphorus, Inc. (King of Prussia, PA). Diluents were supplied by Stepan Company, BASF, Procter & Gamble Chemicals, Brenntag Great Lakes and Vertec Biosolvents. Piperonyl butoxide (PBO) was purchased from Takasago International Corp. Essential oils or botanicals were purchased from The Good Scents Company, The Lebermuth Company, Berje, and Takasago International Corporation.

Statistical Analysis. To determine if mean knockdown and mean mortality were significantly different between treated cages and control cages, Fisher's Exact test was used to compare odds ratios in contingency tables. This test reported a p-value for a hypothesis test that proportions were the same for independent conditions. Every distance compared pairwise against the control was extremely significant (p-value $p<2\times10^{-16}$).

Mosquitoes for field trials. *Culex, Anopheles* and *Aedes* adult mosquitoes for the field trial were reared from pupae shipped overnight from the Clarke Technical Center Insectary to the Florida Research Laboratory. Mosquitoes were fed a 10% to 20% sugar water solution upon emergence and were maintained on 10% to 20% sugar water throughout the field trials. For laboratory experiments and assays, the desired number of adult mosquitoes (typically about three to seven days old) were isolated and maintained on 10% to 20% sugar water solution.

Field Trials with CIELO formulations. Chemical control of *Aedes aegypti* is a key element for integrated strategies of mosquito management. Among chemical control methods, space spraying treatments—indoors and outdoors—are recommended by the World Health Organisation (WHO) to control mosquito vectors of disease, including *Ae. aegypti*. Space treatments are expected to provide a rapid mortality effect (and knock-down in the case of pyrethroids) on adult populations, which is particularly important in emergency or epidemic situations. Insecticide application at ultra-low volume (ULV) is one of the most important tactics for mosquito control, because it can be applied promptly and with a wide coverage in high risk urban areas and is directed to the adult population, the most important stage of the mosquito life cycle. Insecticidal formulations of the present disclosure can be designed as ready-to-use formulations that can be applied undiluted with hand held, truck mounted and aerial ULV sprayers. Formulations of the present disclosure, also referred to as "CIELO," were evaluated as a mosquito adulticide against *Aedes aegypti* mosquitoes according to WHO Guidelines for Efficacy testing of insecticides for space sprays. For the purposes of the present disclosure, the term "CIELO" is an internal designation.

Figure 8:
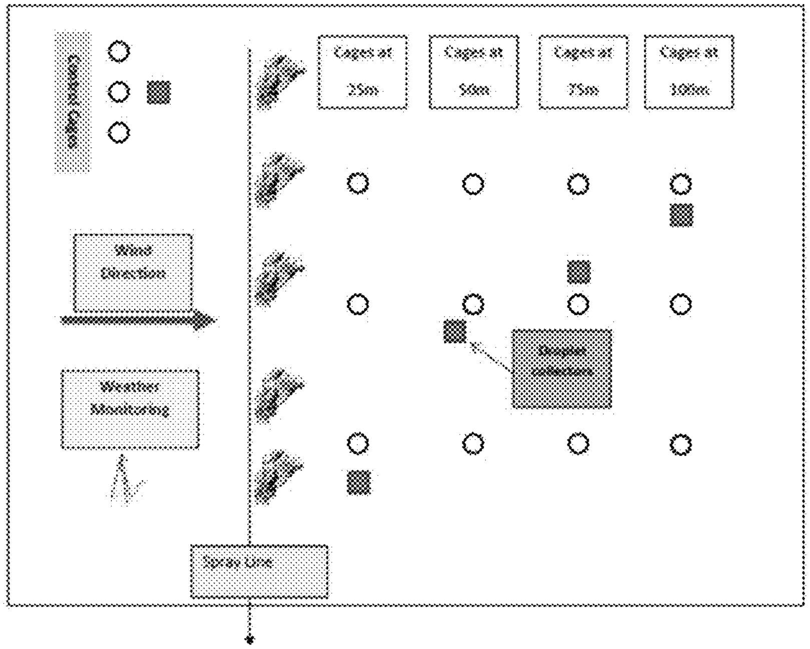
FIG. 8 is a field plot diagram of the application and setting of spray cages.

In some embodiments, CIELO is a liquid Ultra Low Volume (ULV) mosquito adulticide designed for direct application without dilution, using appropriate thermal & cold fogging application equipment. In some embodiments, CIELO includes two active ingredients; 3% w/w Imidacloprid 1-[(6-chloro-3-pyridinyl)methyl]-N-nitro-2-imidazolidinimine and 0.75% w/w Prallethrin: (RS)-2-methyl-4-oxo-3-(2-propynyl) cyclopent-2-enyl-(1RS)-cis, trans-chrysanthemate. Formulations can include ready-to-use formulations with no dilution required before application. In the following field trial data, embodiments of CIELO formulations are referred to a as "CMP123-004." Manufacturer's recommendations for Imidacloprid use is 2 g to 4 g per hectare and 0.2 to 0.4 g per 1000 $m^2$ for outdoor and indoor use, respectively. The rate of prallethrin can be 0.5 g to 1 g per hectare and 0.05 to 0.1 g per 1000 $m^2$ of prallethrin for outdoor and indoor use, respectively. Outdoor spray application testing was completed with a LECO ULV fog generator Model 1800E cold fogger sprayer mounted on a truck. The head nozzle was pointed upwards at an angle of 90 degrees to the horizontal plane. The path ran by the truck was at least 200 meters with the cages distributed in the middle of the path. A 4×3 grid design was used for the experiment. Three rows of adult mosquito cages (14.4-cm diam and 4-cm depth; with nylon mesh having 1.2×1.2 mesh openings) were placed at 25 m, 50 m, 75 m and 100 m downwind and perpendicular to the spray path. Stakes (1.5-m height) with treatment cages (one cage at each distance for the CF strain). The spray cages were attached to a wind vane to maintain the open sides of the cages perpendicular to the wind direction. The experimental design included 12 cages total per application; 4 distance points×3=12 cages for each dose rate. 3 replicates per dose=36 cages total for each dose rate. A row of three sentinel cages were located outside (upwind at a minimum of 50 m) of the test area as untreated controls for each application. The control cages were held far from the treatment cages, as shown in FIG. 8.

A LECO 1800 E (Clarke Mosquito Control, Roselle, IL, USA) cold aerosol fogger was used calibrated to apply 80 ml/min to 270 ml/minute of CIELO formulation (Table 13) and achieve droplet size (VMD) of 19-25 microns VMD at speeds up to 15 km/hour. Changing droplet VMD from 25 microns VMD to the range of 19-25 microns VMD was also tested. Droplet size measurements were obtained using a DC-IV portable droplet measurement system (KLD Laboratories, Huntington Station, NY, USA). Table 13 provides information on the calibration and characterization of the LECO Sprayer. Spray droplet characterization was conducted before the start of tests and calibration of equipment was made at the end of each application.

The LECO 1800E used in the outdoor trial is fully compliant with the requirements of the WHO Equipment for Vector Control Specification Guidelines (WHO/HTM/NTD/WHOPES/2010.9) revised edition 2010.

A total of 25 females of *Aedes aegypti* (CF strain) were placed in each cage. Mortality data were recorded at 1 h (knockdown), 24 and 48 h after treatment. The sentinel cages were used as a control for the treatments.

Meteorological data were recorded using a Kestrel 5500 Weather Meter mounted at 1.5 m above ground level and two Kestrel D3 DROP meters placed at 1.5 m and 10 m. Both Kestrel DROPS were mounted inside a radiation shield. Weather data was compiled as; temperature (° C.), relative humidity (RH), wind speed in meters per second (m/s) and wind direction (Magnetic North).

One slide impinger was set up with cages placed at 25 m, 50 m, 75 m and 100 m downwind to the spray path. The slide impinger was set 1.5 m away from spray cages.

Data recording and analysis. For outdoor trials, data were recorded in suitable forms (not included, but can be supplied upon request). Mortality at each time (1 h, 24 h and 48 h) was corrected by Abbott's (1925). The results were analyzed and differences among treatments were studied using one-way factorial ANOVA with values transformed into arcsin. The results were subjected to probit analysis using computer software to estimate the lethal dose to kill 90% of the population ($LD_{90}$).

Meteorology and droplet size analysis are also reported.

Example 1: Compositions

Compositions according to the present disclosure can be prepared as follows:

| | | |
|---|---|---|
| CAS # 138261-41-3 (imidacloprid) | 3.00 | % Wt |
| CAS # 23031-36-9 (prallethrin) | 0.75 | % Wt |
| CAS # 6485-40-1 (l-carvone) | 5.00 | % Wt |
| CAS # 108-32-7 (propylene carbonate) | 40.00 | % Wt |
| CAS # 25322-68-3 (PEG 400) | 36.25 | % Wt |
| CAS # 9003-11-6 (PEG/PPG (n/n) Block Co-polymer) | 15.00 | % Wt |

Imidacloprid was added to the propylene carbonate, then 1-carvone was added and the mixture was stirred and heated until imidacloprid was fully mixed. Heating was stopped while stirring was maintained. The other active and inert ingredients were added under constant stirring. Once all ingredients were added, the solution was stirred until homogeneous.

Example 2: Compositions

Compositions according to the present disclosure can be prepared as follows:

| | | |
|---|---|---|
| CAS # 26002-80-2 (sumithrin) | 5.00 | % Wt |
| CAS # 23031-36-9 (prallethrin) | 1.00 | % Wt |
| CAS # 51-03-6 (piperonyl butoxide - PBO) | 5.00 | % Wt |
| CAS # 108-32-7 (propylene carbonate) | 25.00 | % Wt |
| CAS # 25322-68-3 (PEG 400) | 59.00 | % Wt |
| CAS # 9003-11-6 (PEG/PPG (n/n) Block Co-polymer) | 5.00 | % Wt |

Sumithrin was added to propylene carbonate, followed by PBO and prallethrin. The mixture was stirred until homogenous. PEG 400 and PEG/PPG (n/n) Block co-polymer were added and the solution was stirred until homogeneous.

Example 3: Insecticidal Field Assay

The composition according to Example 1 was tested to determine efficacy. The objective of this study was to determine the efficacy of Example 1 in an open field caged trial against adult *Aedes aegypti, Culex quinquefasciatus*, and *Anopheles quadrimaculatus* mosquitoes. This study was conducted in Lake Wales, Florida on the formulation of Example 1 applied using the Clarke Cougar ultra-low-volume (ULV) cold aerosol spray equipment.

The trial was conducted at an application rate of 0.67 oz./acre (low label rate) and 0.99 oz./acre (mid label rate) against adult caged female *Aedes aegypti, Culex quinquefasciatus*, and *Anopheles quadrimaculatus*.

Mosquitoes used during the study were three to five day old adult females *Aedes aegypti, Culex quinquefasciatus*, and *Anopheles quadrimaculatus*. Pupae were provided by the Clarke insectary for the bioassay, the mosquitoes were reared and emerged in cages stored in a secure, temperature-controlled location. They were fed a 10% to 20% sugar water solution throughout the study period. The mosquitoes were visually inspected for accurate species identification and viability.

Approximately 15-25 mosquitoes were mouth-aspirated using aspirators with HEPA-filters into standard cylindrical cardboard spray cages (14.4 cm diameter) or holding cages. (Townzen, K. R. et al., 1973). Mosquito cages were then placed in an enclosed container and stored in a secure environment until placed in field for evaluation.

The treatment site consisted of an open grassy field large enough for a 1000-foot spray tangent and a 300-foot swath. Rotary slide impingers with Teflon-coated slides were placed on stakes adjacent to spray cages at 100, 200 and 300 feet of each replicate. Spray cages were placed on five-foot stakes, (three cages per stake, one cage per species), at an angle perpendicular to the spray line. Stakes were placed at 100, 200 and 300 feet down-wind at a 90° angle from the spray line. Cages were placed in one column 100 feet apart. A total of nine spray cages per species were used for each replicate, and one control cage per species was used per application rate (three replicates).

Teflon coated slides were used to sample the spray cloud at 100, 200, and 300 feet down wind of the spray truck tangent using Leading Edge Slide Impingers. Droplets were collected in each replicate and analyzed using a spread factor of 0.71 (Anderson, C. H. et al., 1971; May, K. R et al., 1950).

A Kestrel meteorological station was placed on site at a 30 foot elevation at the start of the trials to confirm temperature inversion. An additional Kestrel meteorological station was placed at five feet, including wind direction, wind speed, temperature, and relative humidity. Data was recorded at one-minute intervals after initial insecticide release (Christensen, P. W. et al., 1972).

The formulation was applied using the Cougar, a term for the standard ground ULV equipment commonly used for adult mosquito control. Equipment was calibrated to deliver a low-rate of 0.67 oz/acre and a mid-rate of 0.99 oz/acre of undiluted formulation.

A total of three replications per application rate were made for this trial. Following each spray, the treated mosquitoes were allowed ten minutes of exposure and then transferred to clean holding cages for knockdown and mortality monitoring.

Mosquitoes were fed a 10% to 20% sugar water solution and monitored at one hour for knockdown and 24 hours for mortality. Mosquitoes were considered knocked down if they remained moribund after receiving a slight puff of air from the observer. For the 24-hour mortality ratings, any movement by a mosquito required the observer to record the individual as alive.

Untreated control cages were used per three replicates; a single control cage was used for the low-rate and then the mid-rate. Control cages were placed upwind from the spray tangent during treatments to protect from contamination and were handled in a manner identical to treated mosquitoes.

Droplet size (VMD) and drop densities (drops per square centimeter) were determined for each distance following each spray.

The summary data for the VMDs and droplet densities are reported in Table 2. When accounting for low and mid rates at all distances and replicates, the composition was found to have VMVDs ranging from 12.3 and 16.5 m and drop densities between 222.0 and 574.0 drops/cm$^2$.

TABLE 2

Average Droplet VMD and Density Data

| Lake Wales Municipal Airport, Florida | Distance | | | | | |
|---|---|---|---|---|---|---|
| | 100 feet | | 200 feet | | 300 feet | |
| | VMD | Drop Density | VMD | Drop Density | VMD | Drop Density |
| Cougar, low rate | 12.3 | 577.4 | 16.45 | 271.3 | 16.1 | 224.2 |
| Cougar, mid rate | 17.1 | 393.3 | 15.8 | 268.0 | 15.0 | 222.0 |

Bioassay results are summarized in Tables 3, 4, 5, and 6 for applications at the study site location, data information was recorded on site and the average wind speed was found to be five mph and wind direction ranged from 108 to 133 degrees.

TABLE 3

Average % Mortality using Cougar at mid-rate

| Distance (feet) | % Mortality | | |
|---|---|---|---|
| | *Aedes aegypti* | *Culex quinquefasciatus* | *Anopheles quadrimaculatus* |
| 100 | 100% | 100% | 100% |
| 200 | 100% | 100% | 98% |
| 300 | 81% | 98% | 96% |

TABLE 4

| Average % Mortality using Cougar at low-rate | | | |
|---|---|---|---|
| Distance | % Mortality | | |
| (feet) | *Aedes aegypti* | *Culex quinquefasciatus* | *Anopheles quadrimaculatus* |
| 100 | 98% | 100% | N/A |
| 200 | 98% | 100% | N/A |
| 300 | 88% | 95% | N/A |

Example 4: Insecticidal Field Assay

The composition according to Example 2 was tested to determine efficacy. The objective of this study was to determine the efficacy of Example 2 in an open field caged trial against adult *Aedes aegypti, Culex quinquefasciatus*, and *Anopheles quadrimaculatus* mosquitoes. This study was conducted in Lake Wales, Florida. The composition was applied using the Clarke Cougar ultra-low-volume (ULV) cold aerosol spray equipment.

The treatment site consisted of an open area (no more than ten acres) with low to ground vegetation and large enough to allow for a 1000-foot spray tangent and a 300-foot swath width. Study site location was an open field with mowed grass and no obstructions. The study was conducted after the first hour of dusk once temperature inversion was confirmed.

Pupae were provided by the Clarke Insectary for the bioassay; the mosquitoes were reared and emerged in cages stored in a secure, temperature-controlled location. They were fed a 10% to 20% sugar-water solution throughout the study period. The mosquitoes were visually inspected for accurate species identification and viability.

The first spray was conducted as an open field caged study. Cages were placed in three lines, 100 feet apart, at 100, 200, and 300 foot distances perpendicular and downwind to the spray tangent. All three species were used during this spray and mosquitoes used were three to six day old adult females *Aedes aegypti, Culex quinquefasciatus*, and *Anopheles quadrimaculatus*. The flow rate was set at 0.33 fl. oz./acre.

Approximately 15-25 mosquitoes were mouth-aspirated using aspirators with HEPA-filters into standard cylindrical cardboard spray cages (14.4 cm diameter) or holding cages. (Townzen, K. R. et al., 1973). Mosquito cages were then placed in an enclosed container and stored in a secure environment until placed in field for evaluation.

Spray cages were placed on five-foot stakes (one cage per stake) at an angle parallel to the spray line. Stakes were placed at 100, 200, and 300 feet down-wind at a 90° angle from the spray line. Cages were placed in three rows 100 feet apart. Each replicate had nine cages-three cages per each species—and was placed in a random order on the field. There was also three control cages-one per each species-placed on separate five-foot stakes.

Rotary slide impingers with Teflon-coated slides were placed on stakes adjacent to spray cages at all nine stations of each replicate. The slides were used to sample the spray cloud at 100, 200, and 300 feet down wind of the spray truck tangent using Leading Edge Slide Impingers. Droplets were collected in each replicate and analyzed using a spread factor of 0.645 (Anderson, C. H. et al., 1971; May, K. R et al., 1950). Only the slides located at the four corners and the center were read under the microscope. The remaining slides were only analyzed if there were any discrepancies in the mosquito mortality data.

A Kestrel meteorological station was placed on site at a 30 ft elevation at the start of the trials to confirm temperature inversion. An additional Kestrel meteorological station was placed at five feet, including wind direction, wind speed, temperature, and relative humidity. Data was recorded at one-minute intervals after initial insecticide release.

Spray cages were placed on stakes having an elevation of five feet; just one cage was placed per stake. There were three cages per each species of mosquitoes (*Aedes aegypti, Culex quinquefasciatus*, and *Anopheles quadrimaculatus*), resulting in nine cages total per each of the three replicates. Tables 5, 6, and 7 show the average results of the droplet data and mosquito mortality.

TABLE 5

| Average Percent Mortality of Mosquitoes | | | |
|---|---|---|---|
| Distance | % Mortality | | |
| (feet) | *Aedes aegypti* | *Culex quinquefasciatus** | *Anopheles quadrimaculatus* |
| 100 | 100% | 100% | 98% |
| 200 | 93% | 100% | 89% |
| 300 | 88% | 84% | 100% |

*Spraying conditions were optimized for *Culex quinquefasciatus* due to mosquito behavior in the field (see Table 9).

TABLE 6

| Average Droplet VMDs and Densities for *Aedes aegypti* and *Anopheles quadrimaculatus* Distance (feet) | | | | | | | | |
|---|---|---|---|---|---|---|---|---|
| 100 | | | 200 | | | 300 | | |
| Station | VMD | Drop Density | Station | VMD | Drop Density | Station | VMD | Drop Density |
| 1 | 18.3 | 264.3 | 5 | 15.4 | 281.3 | 7 | 15.3 | 377.6 |
| 3 | 15.0 | 244.4 | | | | 9 | 13.7 | 83.8 |

TABLE 7

| Average Droplet VMDs and Densities for *Culex quinquefasciatus* Distance (feet) | | | | | | | | |
|---|---|---|---|---|---|---|---|---|
| 100 | | | 200 | | | 300 | | |
| Station | VMD | Drop Density | Station | VMD | Drop Density | Station | VMD | Drop Density |
| 1 | 19.0 | 2270.1 | 5 | 20.7 | 984.1 | 7 | 16.3 | 593.6 |
| 3 | 20.9 | 1332.9 | | | | 9 | 17.4 | 430.4 |

Example 5: Effects of Wetting Agent(s)

The ability of insecticidal compositions of the present disclosure formulated with a wetting agent(s) to increase insecticidal delivery efficiency and maximize mosquito mortality was tested. Mosquitos were treated with the formulations presented below in Table 8, which included varying amounts (% wt) of polyalkylene block copolymers. The insecticidal compositions were applied directly to each of 100 individual mosquitos per formulation. As shown below, increasing amounts of polyalkylene block copolymer in the formulations caused an average increase in the percent mortality of mosquitos of both *Aedes* and *Culex* genera. Mortality rates for *Aedes:* 18.5% mortality at 5% polyalkylene block copolymer; 28.5% at 10% polyalkylene block copolymer; 33% mortality at 15% polyalkylene block copolymer; and 30% mortality at 20% polyalkylene block copolymer. Mortality rates *Culex:* 39% mortality at 5% polyalkylene block copolymer; 44% at 10% polyalkylene block copolymer; 57% mortality at 15% polyalkylene block copolymer; and 46% mortality at 20% polyalkylene block copolymer. (Higher amounts may be asymptotic.) These data demonstrate the surprising and unexpected effects that the inclusion of polyalkylene block copolymers as wetting agents have on mosquito mortality.

TABLE 8

| Percent Mortality of Aedes and Culex in Direct Contact Tests | | | | | | | |
|---|---|---|---|---|---|---|---|
| | Imidacloprid % wt | Prallethrin % wt | PEG % wt | Polyalkylene Block Copolymer % wt | Propylene Carbonate % wt | Aedes % Mortality | Culex % Mortality |
| Trial #7 186-47-04 | 3.04 | — | 200; 44.27 | 5 | 47.69 | 18 | 24 |
| Trial #10 186-52-11 | 3.04 | 0.55 | 200; 44 | 5 | 47.41 | 19 | 54 |
| Trial #8 186-47-16 | 3.04 | — | 200; 41.86 | 10 | 45.1 | 23 | 54 |
| Trial #11 186-52-25 | 3.04 | 0.55 | 200; 41.6 | 10 | 44.81 | 34 | 34 |
| Trial #12 186-54-11 | 3.04 | 0.54 | 200; 39.20 | 15 | 42.22 | 33 | 57 |
| Trial #13 186-54-26 | 3.04 | 0.54 | 200; 36.7 | 20 | 39.63 | 30 | 46 |

Example 6: Effects of Wetting Agent Concentration on Mosquito Mortality

The ability of insecticidal compositions of the present disclosure formulated with a wetting agent(s) to increase insecticidal delivery efficiency and maximize mosquito mortality was tested. Mosquitos were treated with the formulations containing an insecticide (e.g., imidaclorprid) and varying amounts (% wt) of a wetting agent(s) (e.g., polyalkylene block copolymer).

Efficacy of insecticidal formulations were tested on three different mosquito genera: *Culex* (e.g., *Culex quinquefasciatus*), *Aedes* (e.g., *Aedes aegypti*), and *Anopheles* (e.g., *Anopheles quadimaculatus*). Adult mosquitoes were reared on 20% sucrose solution in an insectary maintained at 27° C., 80% humidity, and a 12/12 hour light/dark photoperiod. Adult females of each species were segregated in 12"×12" screen cages based on date of eclosion. For each species, approximately 20 female mosquitoes were aspirated out of their respective cage and into a spray cage (screened cup). For each treatment, six cages per species were used: one negative control and five formulation sprays. A positive control with a known commercial pesticide was used following the same protocol. Each spray cage was set-up in the spray chamber, then 5 L of insecticidal formulation (including wetting agent) was injected and atomized into the sprayer, carried by compressed air through the chamber and cage, and allowed to run for 30 seconds. Immediately following the application, the mosquitoes were gently transferred into a clean screened paper holding cup. A cotton pad saturated with 20% sucrose solution was placed on top of the mesh screen of each cup for hydration and nourishment. The condition of the mosquitoes in each cup was recorded at one hour (for knockdown) and 24 hours (for mortality) after initial treatment. Relative humidity (RH) and temperature were kept constant for all trials. Mosquitoes were housed in a bioassay room before and after spraying, which was held at 22-30° C. and 45-85% RH. Mosquito ages were as follows: *Aedes*—6-7 days old; *Culex*—4-6 days old; *Anopheles*—5-6 days old. Droplet size was consistent between trials. The lowest drop density was 227.9 and the highest was 411.8. Percent knockdown and mortality for each replicate as well as mean percent knockdown and mortality for each treatment were calculated.

FIG. 1 provides a representative graph summarizing the mortality of each species for an increasing percentage of wetting agent present in the insecticidal formulations. As demonstrated in FIG. 1, the inclusion of a wetting agent(s) in the insecticidal formulations of the present disclosure increased percent mortality at 24 hours for all three mosquito species tested as compared to controls. For *Aedes*, these data demonstrate that formulations containing at least 5% wetting agent are sufficient to cause a significant increase in mosquito mortality (e.g., >25%). For *Culex*, these data demonstrate a linear trend in which increasing percentages of wetting agents generally cause increasing mosquito mortality at the wetting agent percentages tested. Formulations containing at least 10% wetting agent were sufficient to cause at least a 25% increase in mosquito mortality compared to controls. For *Anopheles*, the inclusion of wetting agent(s) in the insecticidal formulations caused the most significant increases in mosquito mortality. Formulations containing 15% wetting agent caused, however, the highest amount of mosquito mortality compared to the other percentages, including 20% wetting agent (non-linear trend). Similarly, formulations containing 5% wetting agent caused higher mosquito mortality compared to 10% wetting agent. Although these data clearly demonstrate the ability of the wetting agent to increase insect mortality, species-specific variation in percent mortality, as well as the generally non-linear relationship between percent mortality and the concentration of the wetting agent(s) indicate that the mechanism of action is somewhat unpredictable.

The insecticidal formulations tested in these studies are consistent with those used in the field tests described below. In some cases, however, insecticidal formulations used in an experimental lab context are diluted (e.g., 10% dilution) as compared to the formulations used for outdoor/indoor field testing in order to allow for more relevant comparisons between treatment groups.

As demonstrated herein, the inclusion of wetting agent(s) in insecticidal formulations of the present disclosure enhance the efficacy of the insecticide and lead to increased mosquito mortality. Without limiting the scope of this disclosure or being bound to a particular theory, wetting agent(s) of the present disclosure may increase the efficiency at which an insecticide can be delivered to an insect. For example, in addition to insecticide that may be ingested by an insect, the inclusion of wetting agent(s) in an insecticidal composition can provide an additional route of entry for the insecticide by facilitating the absorption or penetration of the insecticide though the insect cuticle, thus maximizing insect mortality over a given exposure time. In some cases, the inclusion of wetting agent(s) in insecticidal formulations of the present disclosure has the surprising and unexpected effect of enhancing the efficacy of an insecticide considered to be primarily effective through ingestion only, and not otherwise able to penetrate effectively an insect cuticle (e.g., imidacloprid). In this manner, insecticidal formulations of the present disclosure can also provide more effective means for delivering a particular insecticide to an insect than is currently known or used by one of ordinary skill in the art.

Example 7: Drop Size Distribution

In a series of wind tunnel tests, drop size distribution from a Micronair AU5000 was characterized for CIELO formulations. Wind tunnel speed was 176 kph. Flows tested were 2 and 4 L/min/atomizer. Atomizer rpm was 8000 and 10000 rpm.

Figure 2A:
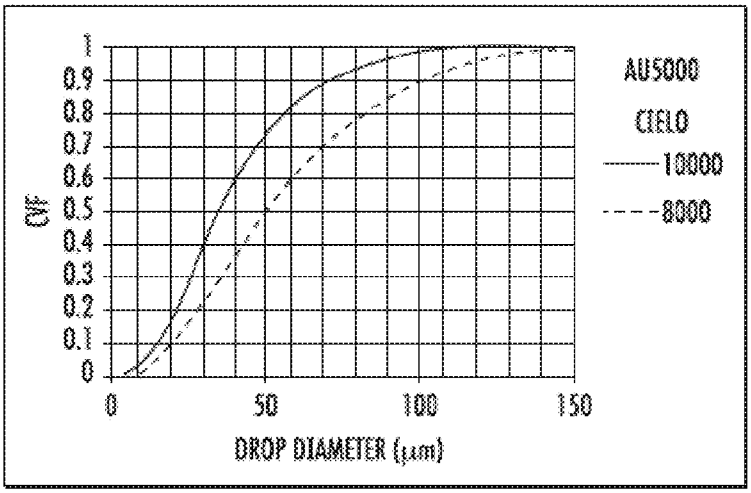
FIGS. 2A-2B include representative analysis of the drop size distribution as characterized for insecticidal formulations in a series of wind tunnel tests.
Figure 2B:
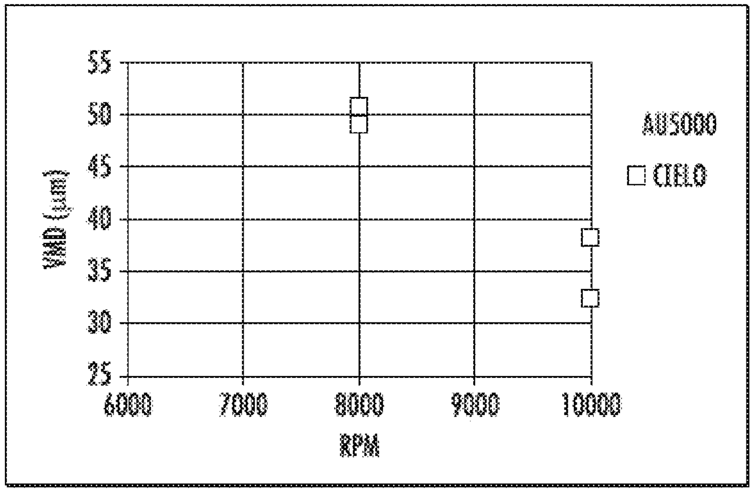

In FIG. 2A, cumulative volume fraction (CVF) curves are plotted for CIELO formulations through a Micronair AU5000 spinning at 8000 and 10000 rpm (dry rpm). Curves are the average of multiple trials involving two flows. At 10000 rpm, 50% of emitted volume is in drop sizes less than 35 μm while at 8000 rpm, less than 30% of emitted volume is in the same drop size. At the lower rpm, ten percent of emitted spray volume is associated with drops greater than 100 μm. Flow variation had a small impact on average volume median diameter at 10000 rpm with VMD ranging 2 m (FIG. 2B). Slowing atomizer rpm rapidly increased VMD. At 8000 rpm, VMD increased to 50 μm.

Example 8: Evaporation Trials

All pesticide formulations are composed of a carrier (in this case oil) and a nonvolatile fraction containing the active. Generally, oil-based droplets are assumed not to evaporate. Although this assumption may be appropriate when spraying large drops from heights that are close to a target, the same assumption may not be appropriate when spraying small drops (<50 μm) from high heights (>60 m) which can occur during long transit times when application of the formulation travels from aircraft to the intended target.

Figure 3A:
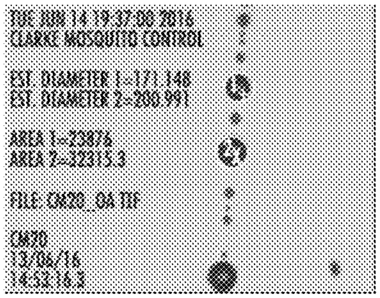
FIGS. 3A-3G include a representative analysis of the evaporative properties of insecticidal formulations.
Figure 3B:
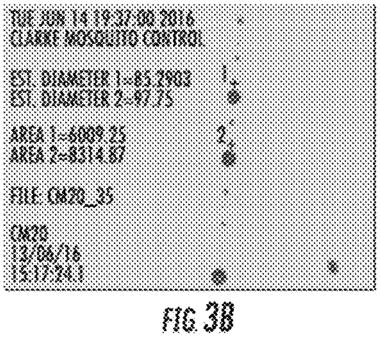

Evaporation studies on CIELO formulations were completed in a controlled environmental chamber. Briefly, droplets were generated in still air, captured and suspended on a strand of webbing. Evaporation of the droplets in a steady air stream near 50 cm/s was recorded for controlled conditions of temperature and relative humidity. Replicate trials at temperatures of 20° C. and 30° C. were completed for the CIELO formulation. Relative humidity as a variable was not evaluated. The diameter and cross-sectional area of captured drops (FIGS. 3A-3B) were recorded from t=0 (when air flow commenced) to 20 min.

Initial drop sizes were around 200 μm. Although much larger than drops used for adulticide sprays, evaporation rate is independent of drop size. By using large drops, evaporation progresses substantially slower than for small (<50 μm) drops. For spray-drift modeling, oil-based products are considered to be nonvolatile (i.e., the do not evaporate). While this assumption may work when spray heights are low, drops are large and drift time is short, the same is not necessarily true when spray heights are high (90 m), drops are small (<50 μm) and drift time is long.

The AGDISP model used assumes that all spray material is composed of a carrier (in this case, oil) and a nonvolatile fraction containing the actives. Evaporation of the carrier is controlled by evaporation rate, temperature, relative humidity, and atmospheric pressure in the form of wet bulb temperature depression and the relative velocity of the droplet in its environment. The model assumes that the carrier is always available for evaporation, until the nonvolatile fraction is reached, at which time evaporation ceases.

Droplet evaporation can be described by the diameter-squared law, in which the time rate of change of droplet diameter is given as (equation 1):

$$1 - \frac{D^2}{Do^2} = \frac{t}{\tau\epsilon}$$

where D is the droplet diameter (μm) at time t (sec), and $\tau\epsilon$ is the evaporation time scale of the droplet, defined by (equation 2):

$$\tau_\epsilon = \frac{2Do2}{\lambda\Delta\theta Sh}$$

where Do is the initial droplet diameter (μm), λ is the evaporation rate (μm$^2$ s$^{-1}$° C.$^{-1}$), ΔΘ is the wet bulb temperature depression (° C.), and Sh is the Sherwood number. The Sherwood number reflects droplet size and relative velocity of a droplet in its environment through the Reynolds number. For a droplet falling during an aerial spray, the Sherwood number reflects the terminal velocity of the droplet and hence is a function of droplet size and specific gravity. For these evaporation studies, the Sherwood number remained relatively constant as the initial droplet diameter varied little from 200 μm and airflow was constant at 50 cm/s. The evaporation time scale is strongly influenced by initial droplet size.

All formulations contain a nonvolatile component so that in fact evaporation will cease before t reaches $\tau\epsilon$. The approach to the nonvolatile component may reflect a sudden halt in evaporation or may be more gradual as the evaporation rate slowly approaches zero. Such a condition can reflect breakdown of the model assumption that the volatile carrier is always available on the surface of a drop during evaporation.

Figure 3C:
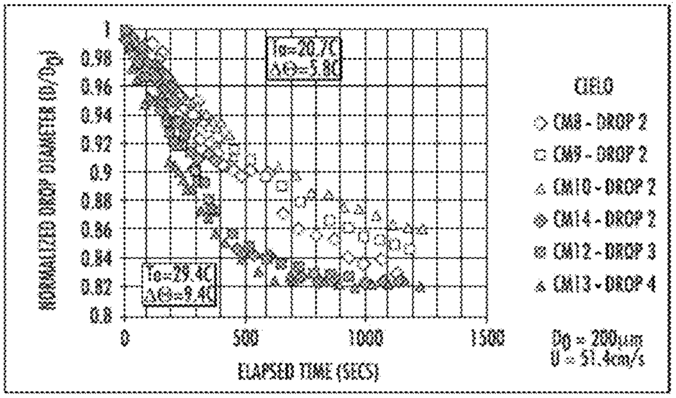

The ratio of drop diameter has been plotted as a function of time for the two temperature regimes of 20.7° C. and 29.4° C. (FIG. 3C). Relative humidity as a variable was not evaluated. Initial drop sizes were significantly larger than those used for adulticides to lengthen evaporation time. Evaporation was observed at both temperatures. When temperature was increased to 30° C., the 200 μm drop evaporated more quickly evaporating to near 84% of its original diameter within 500 seconds. With time, evaporation slowed reflecting a reduced rate at which droplet diameter changed. By 800 sec, the 200 μm CIELO droplet had evaporated to its nonvolatile component with no further evaporation occurring.

Figure 3D:
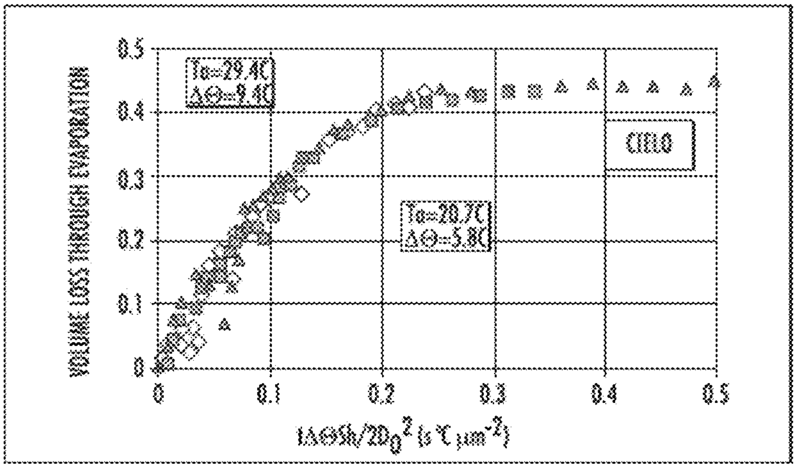

Evaporation curves for the two trials are presented in FIG. 3D. Data for the two temperature conditions are collapsed on to a single curve by plotting volume loss (1−(D/Do)3) against normalized time ($t/\tau\epsilon$). CIELO evaporation is arrested when 45% of the drop had evaporated leaving 55% nonvolatile.

Evaporation Rate can be Determined by Plotting (Equation 3):

$$\frac{D^2}{Do^2} \text{ vs. } \frac{\Delta\theta Sh}{2Do^2}(t)$$

where the slope of the straight line is λ, the evaporation rate and the intercept is 1 ($D^2$=$Do^2$ at t=0).

Figure 3E:
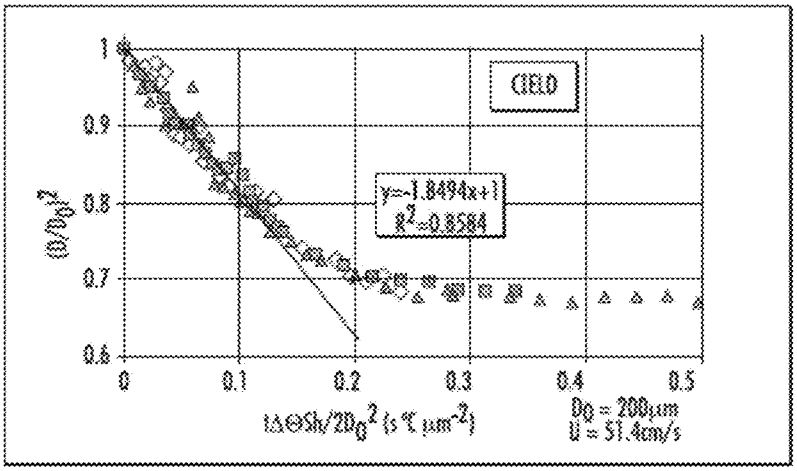

The evaporation rate for CIELO was determined using the relationship in the equation above (i.e., equation 3), resulting in drop size behavior plotted in FIG. 3E. Evaporation rate is represented by the straight line. Deviation away from the straight line may indicate binding of the evaporative component with a decrease in the evaporation rate as CIELO droplets approach their nonvolatile component and evaporation stops. The initial evaporation rate of CIELO (1.85 μm$^2$ s$^{-1}$° C.$^{-1}$) is low when compared to water (λ=62.40 μm$^2$ s$^{-1}$° C.$^{-1}$). Even at this low evaporation rate, however, 40 μm drops would evaporate to their non-volatile component within 30-60 seconds, we before reaching the surface layer.

Figure 3F:
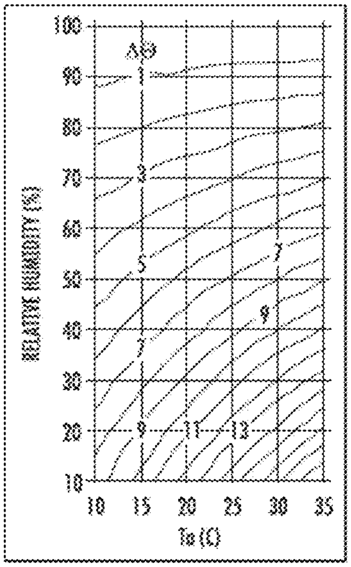

From equation 2, the evaporation time scale ($\tau\epsilon$) varies inversely with wet bulb depression (ΔΘ), a measure of evaporation potential. Spray conditions that are hot and humid (FIG. 3F) lead to a low wet bulb depression and consequently longer evaporation times. At 25° C., a reduction in relative humidity from 92% to 85% will half the lifetime of a droplet while spraying in dryer conditions of 78% RH would decrease droplet lifetime by a third.

Results from the evaporation study are summarized in Table 9. CIELO has an initial evaporation rate of 1.85 μm$^2$ s$^{-1}$° C.$^{-1}$ and a 55% nonvolatile fraction. Consequently, a CIELO drop will evaporate to 82% of its initial diameter.

TABLE 9

Evaporation Rate and Nonvolatile Fraction of CIELO Formulations.

| Product | λ (μm$^2$ s$^{-1}$ ° C.$^{-1}$) | Nonvolatile fraction | $\frac{D_{nv}}{D_0}$ |
|---|---|---|---|
| CIELO | 1.85 | 0.55 | 0.82 |

Figure 3G:
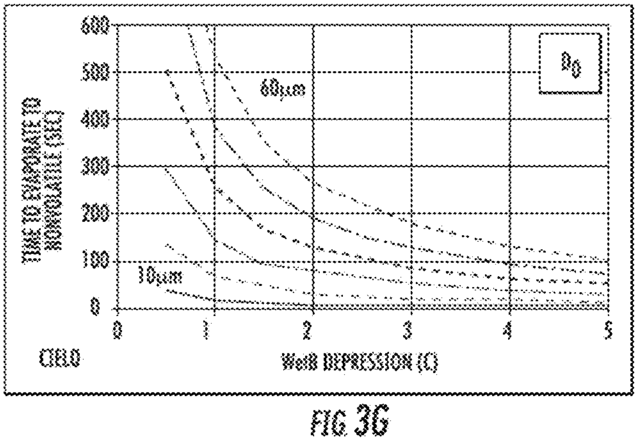

The time for drops to evaporate to their nonvolatile component is plotted for CIELO (FIG. 3G). Initial drop diameters ranging from 10 m to 60 m are followed for a wet bulb depression (ΔΘ) range of 0.5° C. to 5° C. Preliminary calculations for aircraft offset to optimize adulticide sprays indicate that transit time for a spray cloud released at 90 m in 16 kph winds approaches 450 seconds. When wet bulb depression (ΔΘ) is greater than 1° C. or when air temperature is less than 90° F. combined with RH less than 92%, evaporation will be complete (Day reached) for drops smaller than 50 m before the spray cloud reaches its target. Despite reaching Day, the non-volatile components in CIELO ensure that a significant portion of the drop remains. As AO increases, evaporation time scale decreases so that drops larger than 40 m will also fully evaporate before reaching a target area. With adulticide sprays targeting 30-40 m as an emission VMD, more than 50% of spray volume or more than 90% of drops released will have fully evaporated before reaching the target area.

Example 9: Dose Response of CIELO on *Aedes aegypti*

Figure 4A:
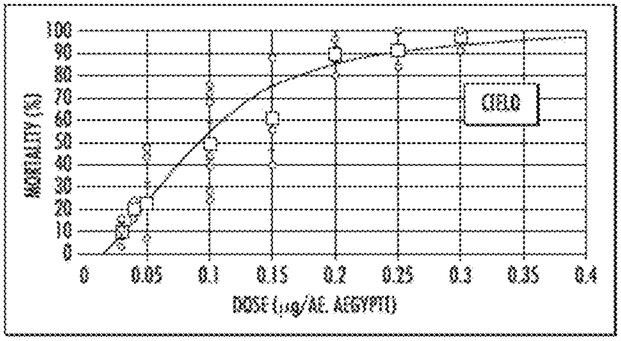
FIGS. 4A-4C include representative analysis of the relationship between dose response curves of insecticidal formulations on *Aedes aegypti* and the drop sizes from an AU5000 atomizer.

Impaction on mosquitoes is governed by collection efficiency and contact area of the insect with resulting mortality dependent upon the dose-response of the pesticide. Results of dosing studies using CIELO are presented in FIG. 4A. Each replicate (red circles) represents a single trial where 25 *Aedes aegypti* were dosed with one of five different concentrations. Some of the variability may be due to the use of different cohorts during the three-week period when the tests were completed. Mortality was established 24 hours post application. Average mortality and standard deviation are graphed in blue squares. The solid line represents a probit analysis (Finney Method) of the average data. The LD50 and $LD_{90}$ of CIELO are 0.09 μg/mosquito and 0.24 μg/mosquito. With CIELO having a specific gravity of 1.13 g/mL, a 74 μm drop ($DLD_{90}$) contains a $LD_{90}$ dose.

Figure 4B:
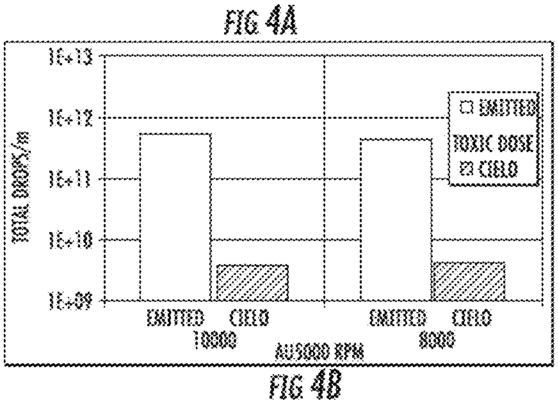
Figure 4C:
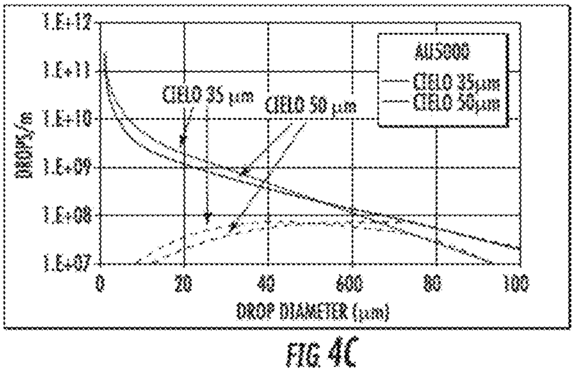

The number of drops emitted per meter of flight line (solid line) is plotted for CIELO (FIG. 4C). VMD ranges from near 35 m when AU5000s are spinning at 10000 rpm to 50 μm when rpm is 8000. Drop numbers represent an 88 mL/ha application of CIELO using a 150 m swath for a Cessna 206H.

At 10000 rpm, the total number of drops produced is 16% greater than at 8000 rpm (FIG. 4B). The difference is due to the increased number of drops produced below 50 m associated with the lower VMD (35 μm). At 8000 rpm, the larger VMD results in significantly more 50+μm drops. It is worth noting that regardless of VMD, the largest number of emitted drops is always in the very small (<20 μm) drop sizes. At both rotational speeds, drops with diameters close to the VMD contribute maximum number of lethal doses (dashed line) to overall mosquito kill.

Example 10: Outdoor Field Trial

Trials were carried out in the city of Merida, Yucatan, south of Mexico (an urban area encompassing 7 municipalities, including the city of Merida), with a population of 1,955,577 (INEGI, 2010), and over a 39,612.15 $km^2$ surface (Table 10). The annual average rainfall is 1050.4 mm with two distinct phases in a year; a dry season from December to April with an annual rainfall of 167.9 mm and a rainy season from May/June to October/November with a rainfall of 882.5 mm (CONAGUA, 2013).

TABLE 10

Description of the study area.

| Study Area | Ecotype/Description | Mosquito Breeding Sites | Major Mosquito |
|---|---|---|---|
| Merida Yucatan (20.76226°0' N, −88.92816°0' O, altitude 534 m) | Merida has a tropical wet and dry/savanna climate (Köppen-Geiger classification: Aw) with a pronounced dry season (January-May) and a wet season (July-November). According to the Holdridge life zones system of bioclimatic classification Merida is situated in or near the subtropical dry forest biome. The annual mean temperature is 26° C. (78.8 ° F.). Average monthly temperatures vary by 5.8° C. (10.4° F.). | Household diverse minor containers (buckets, pans, pots, disposable containers); catch-basins/Storm sewers; vacant lots (disposable container, buckets, tires) | *Aedes aegypti* |

Truck-mounted ground ULV applications were conducted over a pressed gravel surface in a one location in a secure and secluded area of the Yucatan Coliseum in the northern part of the Mexican city of Merida, Yucatan. Three doses of the active ingredient Imidacloprid were applied on different days as shown in Table 11.

TABLE 11

Three doses were applied in different days at 1.39, 3, and 4 g per hectare of the active ingredient Imidacloprid.

| Rate (g/ha) | | Flow Rate @ |
|---|---|---|
| Imidacloprid | Prallethrin | 15 kph (ml/min) |
| 1.39 | 0.35 | 80 |
| 3.0 | 0.75 | 200 |
| 4.0 | 1.0 | 270 |

Treatment 1 included the following: 1.39 g/ha of Imidacloprid and 0.35 g/ha prallethrin applied at a flow rate of 80 ml/min replicated three times at four distances: 25, 50, 75 and 100 m/three rows. A total number of 36 cages were used. Treatment 2 included the following: 3 g/ha of Imidacloprid and 0.75 g/ha Prallethrin applied at a flow rate of 200 ml/min replicated six times at four distances: 25, 50, 75 and 100 m/three rows. A total number of 72 cages were used. Treatment 3 included the following: 4 g/ha of Imidacloprid and 0.10 g/ha Prallethrin applied at a flow rate of 270 ml/min replicated three times at four distances: 25, 50, 75 and 100 m/three rows. A total number of 36 cages were used. And Controls included: three sentinel cages set up at the same time along with the treatments.

TABLE 12

LECO 1800 E calibration and characterization by treatment for CIELO (CMP 123-004) open field trails in Merida, Yucatan, Mexico.

| Environmental | | Calibration | | Equipment Setup | | Characterization (DCIV) | | | | |
|---|---|---|---|---|---|---|---|---|---|---|
| | Ambient | Rate | Flow | Air | | | | | | |
| Time | Temp. (° C.) | (Imidacloprid) (g/ha) | Rate (ml/min) | Pressure (psi) | Engine (rpm) | VMD (µm) | Droplets sampled | $DV_{10}$ | $DV_{90}$ | Span |
| 16:55 | 38 | 3.0 | 200 | 6 | 1920 | 20.5 | 533 | 6.0 | 33.6 | 1.3 |
| 19:30 | 38 | 4.0 | 270 | 6.5 | 2300 | 22.4 | 87 | 7.6 | 34.5 | 1.2 |
| 18:39 | 30 | 1.39 | 80 | 2.5 | 1900 | 21.2 | 106 | 7.0 | 33.3 | 1.2 |

Studies were initiated in Monterrey, Mexico, at UANL with the collection and maintenance of the field susceptible strain of *Aedes aegypti* (Cienega de Flores or CF). The strain was subjected to insecticide susceptibility testing through CDC bottle bioassays every three months. The strain was sent to the UADY in Merida Yucatan to be maintained as a susceptible field strain and tested regularly for insecticide resistance.

Figure 5:
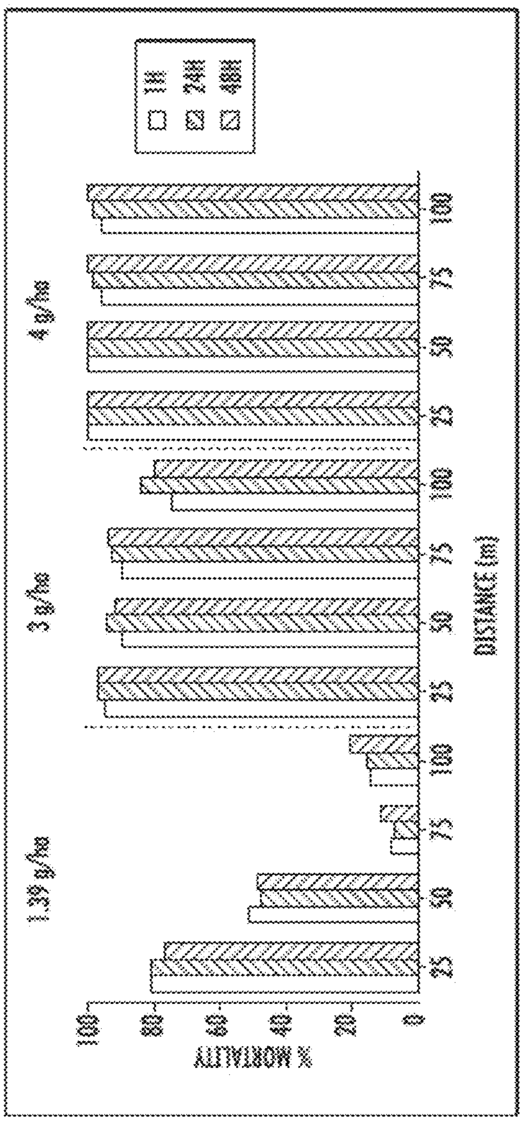
FIG. 5 includes representative mortality percentages for *Aedes aegypti* at 1 hour, 24 hours, and 48 hours post treatment with insecticidal formulations at three different dosages (1.39 g/ha, 3 g/ha, and 4 g/ha) and four different distances from spray path.

Results of knockdown mortality and efficacy at 24 and 48 hours are displayed in Tables 15 and 16, and FIG. 5. The results were averaged and differences among treatments (doses) were studied using one-way factorial ANOVA with values transformed into arcsin ($P<0.05$). Initial average knockdown mortality and mortality at 24 hours at the lowest dose was 80% and 76% at 48 hours for 25 m, lower than the obtained with 3 and 4 g/ha but not significantly different. Significantly lower knockdown, 24 and 48 hour mortality, were obtained at 1.3 g/ha at 50, 75, and 100 min comparison with 3 and 4 g/ha ($P<0.05$).

Efficacy of knockdown at 24 and 48 hours did not differ statistically between 3 g/ha and 4 g/ha and distances. CIELO formulations caused a rank of knockdown mortality of 74 to 95% at 3 g/ha and 95 to 99% at 4 g/ha. Efficacy at 24 hours ranked 83 to 97% at 3 g/ha and 98 to 100% at 4 g/ha. At 48 h mortality at 3 g/ha was 79 to 96% and 99 to 100% at 4 g/ha.

TABLE 13

Mean knockdown mortality (1 h) and mortality (24 and 48 h) for CIELO formulations on an open field trial against caged *Aedes aegypti* CF strain applied with a truck-mounted ultra-low volume (ULV) cold aerosol sprayer at four distances and three doses of Imidacloprid.

| Dose | Distance (m) | Knockdown mortality (%) | Mortality at 24 h (%) | Mortality at 48 h (%) |
|---|---|---|---|---|
| 1.39 | 25 | 80 | 80 | 76 |
| | 50 | 51 | 46 | 48 |
| | 75 | 7 | 6 | 10 |
| | 100 | 13 | 14 | 20 |
| 3 | 25 | 95 | 97 | 96 |
| | 50 | 89 | 94 | 91 |

TABLE 13-continued

Mean knockdown mortality (1 h) and mortality (24 and 48 h) for CIELO formulations on an open field trial against caged *Aedes aegypti* CF strain applied with a truck-mounted ultra-low volume (ULV) cold aerosol sprayer at four distances and three doses of Imidacloprid.

| Dose | Distance (m) | Knockdown mortality (%) | Mortality at 24 h (%) | Mortality at 48 h (%) |
|---|---|---|---|---|
| | 75 | 88 | 92 | 92 |
| | 100 | 74 | 83 | 79 |
| 4 | 25 | 99 | 100 | 100 |
| | 50 | 99 | 100 | 100 |
| | 75 | 95 | 98 | 99 |
| | 100 | 95 | 98 | 99 |

TABLE 14

Mean frequency of knockdown mortality (1 h) and mortality (24 and 48 h) and standard deviation for CIELO formulations on an open field trial against caged *Aedes aegypti* CF strain applied with a truck-mounted ultra-low volume (ULV) cold aerosol sprayer at our distances and three doses of Imidacloprid.

| Dose | Distance (m) | Knockdown Mortality (SD)[1] | Mortality at 24 h (SD)[2] | Mortality at 48 h (SD)[3] |
|---|---|---|---|---|
| 1.39 | 25 | 0.80 (0.27) a | 0.80 (0.26) a | 0.76 (0.29) a |
| | 50 | 0.51 (0.38) bc | 0.46 (0.38) bc | 0.48 (0.33) ac |
| | 75 | 0.07 (0.08) bc | 0.06 (0.07) bc | 0.10 (0.15) bc |
| | 100 | 0.13 (0.17) bc | 0.14 (0.12) bc | 0.20 (0.16) bc |
| 3 | 25 | 0.95 (0.08) a | 0.97 (0.07) a | 0.96 (0.11) a |
| | 50 | 0.89 (0.14) a | 0.94 (0.12) a | 0.91 (0.14) a |
| | 75 | 0.88 (0.17) a | 0.92 (0.10) a | 0.92 (0.12) a |
| | 100 | 0.74 (0.18) a | 0.83 (0.22) a | 0.79 (0.25) a |
| 4 | 25 | 0.99 (0.03) a | 1.00 (0.01) a | 1.00 (0.01) a |
| | 50 | 0.99 (0.02) a | 1.00 (0.01) a | 1.00 (0.01) a |
| | 75 | 0.95 (0.06) a | 0.98 (0.05) a | 0.99 (0.03) a |
| | 100 | 0.95 (0.07) a | 0.98 (0.05) a | 0.99 (0.03) a |

Different letter in the same column means significant difference
[1] $F = 29.2$, d.f = 2, 28, $P = 0.00000919$
[2] $F = 23.1$, d.f = 2, 28, $P = 0.000471$
[3] $F = 29.2$, d.f = 2, 28, $P = 0.00000926$ Results obtained in field bioassays were subjected to probit analysis using POLO Plus Version 1 (LeOra Software 2002-2017) to estimate the lethal dose to kill 90% of the population ($LD_{90}$) for each time of evaluation (1 h, 24 h and 48 h). The significant difference between $LD_{90}$ parameter between times was determined by the overlap of the confidence intervals (Table 15).

TABLE 15

Statistics from Knockdown and Probit analysis for CIELO formulations on open field trial against caged *Aedes aegypti* CF strain applied with a truck-mounted ultra-low volume (ULV) cold aerosol sprayer in Merida Yucatan, Mexico.

| Parameter | 1 h | 24 h | 48 h |
|---|---|---|---|
| $LD_{90}$ g/ha | 3.431 | NC[3] | 3.169 |
| CI (95%)[1] | 3.292-3.590 | NC | 3.057-3.294 |
| Slope (SE)[2] | 3.626 (0.150) | 4.462 (0.173) | 4.435 (0.173) |

[1] Confidence interval at 95%
[2] Slope and standard error
[3] NC Not computable, high heterogeneity $X^2 = 6.7129$, heterogeneity: 6.7129

Knockdown analysis showed that a dose of 3.431 g/ha of Imidacloprid would kill the 90% of the population at 1 h after exposure (i.e., knockdown mortality). Probit analysis showed that a dose of 3.169 g/ha of Imidacloprid would kill 90% of the population at 48 hours.

Results of the spray droplet size distribution analysis are reported in Table 16. Raw data is not included but can be provided upon request. ANOVA one-way factorial analysis was applied to establish differences between application rate and distances. Droplets were collected from all application rates at all distances, with no significant differences detected between distances within the application rates low and medium. All droplets from the downwind distances ranged between 5.2 to 11.1 μm, or the lower dose with no significant difference between distances. Droplet size ranged from 12.3 to 20.3 μm in the medium dose, with no significant difference between distances. For the maximum dose, droplet size ranged from 5.9 to 13.8 μm with significant differences between distances ($P=0.00439$). Droplet VMD measured along the sampling line from 25 m to 100 m was substantially smaller than measured during equipment calibration. These differences may have been due to the environmental conditions (temperature and RH) at the time of these applications indicating that evaporation of spray droplets may have occurred.

16. Teflon coated slide data (sprayer characterized at 25 μm)

| Dose g/ha | distance | VMD μm (DE)[1,2,3] | Cloud NMD (DE)[4,5,6] | Slide density(DE)[7,8,9] |
|---|---|---|---|---|
| 1.3 | 25 | 11.1 (4.1) a | 2.2 (1.9) a | 207.5 (86.9) a |
| | 50 | 9.2 (5.6) a | 2.1 (1.1) a | 321.3 (215.4) a |
| | 75 | 10.1 (3.6) a | 1.3 (0.3) a | 309.9 (211.8) a |
| | 100 | 5.2 (5.4) a | 1.5 (1.3) a | 92.9 (80.5) a |
| 3 | 25 | 20.3 (11.3) a | 2.1 (1.9) a | 869.9 (624.7) a |
| | 50 | 15.2 (4.1) a | 1.3 (0.6) a | 837.4 (668.8) a |
| | 75 | 12.3 (7.0) a | 3.5 (3.7) a | 835.6 (629.1) a |
| | 100 | 12.6 (4.4) a | 2.5 (1.9) a | 534.1 (422.0) a |
| 4 | 25 | 13.8 (5.2) a | 2.2 (1.4) a | 1492.7 (750.2) a |
| | 50 | 8.7 (2.0) abc | 2.0 (0.9) a | 933.6 (487.4) a |
| | 75 | 5.9 (2.6) bc | 1.8 (1.1) a | 1458.2 (799.2) a |
| | 100 | 7.6 (2.8) ac | 1.8 (0.9) a | 1533.7 (771.1) a |

[1] $F = 2.085$; d.f = 1, 10; $P = 0.179$.
[2] $F = 4.071$; d.f = 1, 22; $P = 0.056$.
[3] $F = 10.07$; d.f = 1, 22; $P = 0.00439$
[4] $F = 0.84$; 4; d.f = 1, 10; $P = 0.381$.
[5] $F = 0.646$; d.f = 1, 22; $P = 0.43$.
[6] $F = 0.58$; d.f = 1, 22; $P = 0.454$
[7] $F = 0.644$; 4; d.f = 1, 10; $P = 0.441$.
[8] $F = 0.886$; d.f = 1, 22; $P = 0.357$.
[9] $F = 0.241$; d.f = 1, 22; $P = 0.628$

Table 17 summarizes the meteorology information during the open field trial. Raw data is not shown but can be provided upon request. Weather conditions were similar between the three replicates and in each day and between days.

TABLE 17

Meteorological data summary during CIELO (CMP123-004) open field trials in Merida, Yucatan, Mexico.

| Sampling Instrument Location FORMATTED | | KESTREL DROP 2 10 m | KESTREL DROP 2 1,5 m | KESTREL 5500 1,5m | | | Stability Ratio[1/] | Wind Direction |
|---|---|---|---|---|---|---|---|---|
| DATE-TIME YYYY-MM-DD HH:MM:SS | | Temperature C | Temperature C | Relative Humidity | Wind Speed | Wind Speed | $SR = \frac{T_{z2} - T_{z1}}{u^2} \cdot 10^5$ | Magnetic N |
| Test #2 Replications 1-3 | Average Test #2, Replication #1 | 31.1 | 31.2 | 61.4 | 3.0 | 296 | 1.57 | 62 |
| | Average Test #2, Replication #2 | 29.4 | 29.5 | 70.0 | 3.4 | 340 | 1.01 | 36 |
| | Average Test #2, Replication #3 | 28.8 | 28.9 | 73.1 | 2.2 | 224 | 2.82 | 49 |
| Test #3 Replications 1-3 | Average Test #3, Replication #1 | 25.5 | 25.7 | 78.1 | 3.5 | 370 | 1.12 | 75 |
| | Average Test #3, Replication #2 | 25.5 | 25.6 | 78.3 | 4.1 | 408 | 0.89 | 52 |
| | Average Test #3, Replication #3 | 25.4 | 25.5 | 80.3 | 3.4 | 340 | 1.05 | 47 |
| Test #4 Replications 1-3 | Average Test #4, Replication #1 | 25.4 | 25.4 | 64.7 | 3.8 | 384 | 0.51 | 56 |
| | Average Test #4, Replication #2 | 25.0 | 25.1 | 65.4 | 3.3 | 321 | 0.58 | 47 |
| | Average Test #4, Replication #3 | 24.6 | 24.6 | 68.0 | 2.7 | 273 | −0.14 | 55 |

[1/]Stability Ratio: $SR = \frac{T_{z2} - T_{z1}}{u^2} \cdot 10^5$ $T_{z1}$ = Temperature ° C. at 10 m above f round, $T_{z2}$ = ° C. at 1.5 m above ground, U = Wind speed (cm/second)

Example 11: Indoor Field Trial

Figure 9:
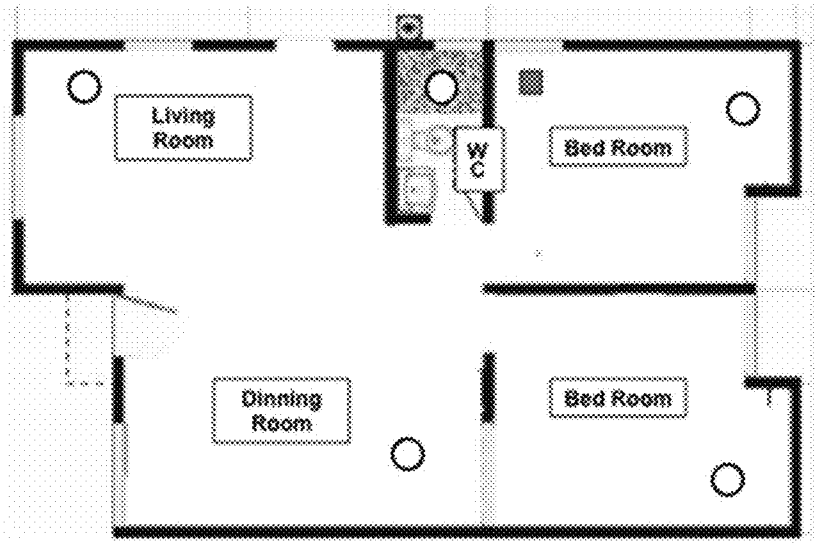
FIG. 9 is a diagram depicting the layout of the houses and setting of the spray cages.

This study was conducted in a residential area located at the outskirts of Merida, Yucatan. Ten houses with the same size, single story and same number of rooms were chosen. The workable areas in each house were: two bedrooms, one bathroom, one dining room and one living room (FIG. 9). One house was designated as control and nine houses were tested with the product.

A Guarany 6 L ULV Knapsack Power Nebulisor, Model 0401.70 (P-2) was calibrated to apply flow rates of 4.0-25 ml/min and characterized to deliver a spray droplet distribution with a Dv.5 of 25-35 m, as per manufacturer's request. Droplet size measurements were obtained using a DC-IV portable droplet measurement system (KLD Laboratories, Huntington Station, NY, USA). Calibration of the Guarany 6 L ULV Knapsack Power Nebulisor (P-2) was achieved through the use of a 0.24 mm inline restrictor, adjustment of the inline flow regulator valve located just before the spray trigger housing, reducing the engine speed from 7200 rpm to 3500 rpm and the spray time for each house was set at three seconds per house (⅓ second per room). The portable ULV Nebulisor was directed from the entrance of each room.

Three doses of Imidacloprid were applied at 0.11, 0.33, and 0.69 g/1000 $m^2$.

Treatment 1 included the following: 0.11 g/1000 $m^2$ of Imidacloprid and 0.0275 g/1000 $m^2$ of Prallethrin applied at a flow rate of 4.6 ml/min in five rooms of each of the nine test houses. Treatment 2 included the following: 0.33 g/1000 $m^2$ of Imidacloprid and 0.085 g/1000 $m^2$ of Prallethrin applied at a flow rate of 12.4 ml/min in five rooms of each of the nine test houses. Treatment 3 included the following: 0.69 g/1000 $m^2$ of Imidacloprid and 0.173 g/1000 $m^2$ of Prallethrin applied at a flow rate of 24.8 ml/min in five rooms of each of the nine test houses. In each room of the house, T-poles were placed, and one treatment cage placed at 1.5 m. One slide spinner was placed in one room of each house.

TABLE 18

Calibration of the equipment and droplet size for the in Guarany P-2 backpack cold fogger application in indoors trials.

| Dose | Calibration Nozzle | In Line Safety Valve | Spray Time per House | Flow Rate (ml/mm) | Rate (g/ 1000 $m^2$) | Dose (ml/ 1000 $m^2$) |
|---|---|---|---|---|---|---|
| Low | Grey (prototype) | 1/2 Turn | 3 second | 4.0 | 0.11 | 3.2 ml |
| Medium | Grey (prototype) | 1.5 Turns | 3 second | 12 | 0.33 | 9.7 ml |

TABLE 18-continued

Calibration of the equipment and droplet size for the in Guarany P-2 backpack cold fogger application in indoors trials.

| Dose | Cali-bration Nozzle | In Line Safety Valve | Spray Time per House | Flow Rate (ml/mm) | Rate (g/ 1000 $m^2$) | Dose (ml/ 1000 $m^2$) |
|---|---|---|---|---|---|---|
| High | Grey (prototype) | open full | 3 second | 25 | 0.69 | 20.2 ml |

Controls included a house with the same number of cages as the test houses. A total of 25 females of *Aedes aegypti* CF strain were placed in each cage. Mortality data were recorded at 1 hour (knockdown), 24 and 48 hours after treatment. The sentinel cages were used as a control for the treatments. Meteorological data were recorded using a HOBO Temp/HR logger.

For indoor trials, data were recorded in suitable forms. The results were analyzed and differences among sites of the house within each dose were studied using one-way factorial ANOVA with values transformed into arcsin. Statistical software used was SPSS 22.0. The results were subjected to probit analysis using POLO Plus Version 1 (LeOra Software 2002-2017) to estimate the lethal dose to kill 90% of the population ($LD_{90}$).

Figure 6:
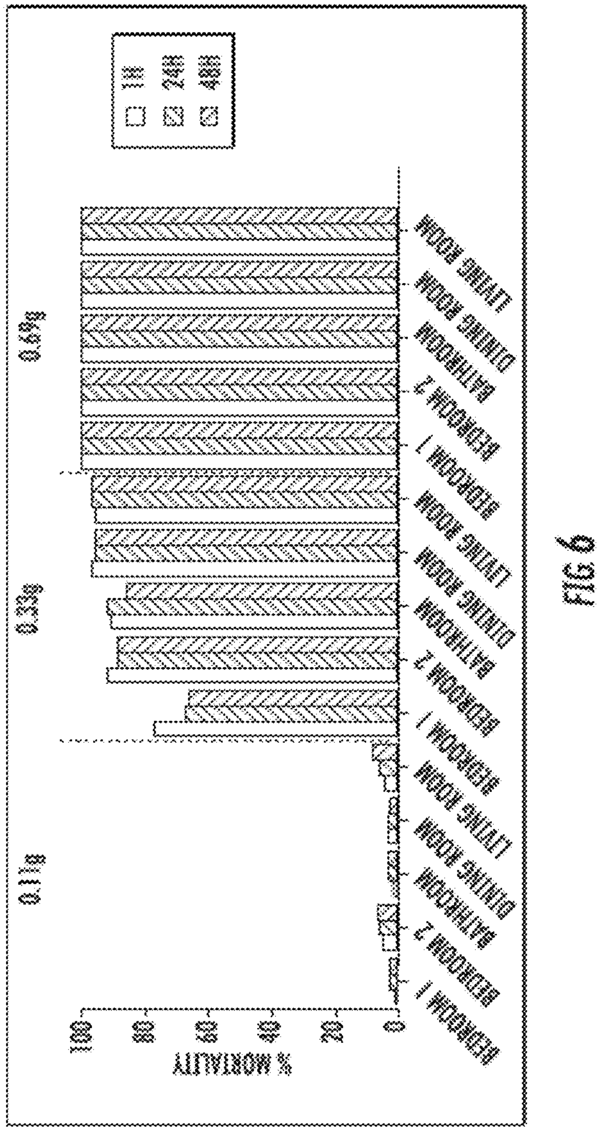
FIG. 6 includes representative mortality percentages for *Aedes aegypti* at one hour, 24 hours, and 48 hours post treatment with insecticidal formulations at three different dosages (1.39 g/ha, 3 g/ha, and 4 g/ha) and four different locations during an indoor trial.

Knockdown mortality and efficacy at 24 and 48 hours. Results are displayed in Tables 21, 22 and FIG. 6. Results were averaged and differences among sites of the house were studied using one-way factorial ANOVA with values transformed into arcsin ($P<0.05$). Raw data is not shown but can be provided upon request. Mortalities at 1 hour, 24 hours and 48 hours for the lowest dose ranked from 0.44 to 5.33%, with no significant difference at each time in different sites of the house.

Efficacy knockdown, and 24 and 48 hour mortality, differ statistically between 0.33 g and 0.69 g and some sites of the house. CIELO formulations caused a rank of knockdown mortality of ~80% to ~95% at 0.33 g/ha and ~70% to ~97% at 24 and 48 hours. Efficacy at the highest dose (0.69 g) was of 100% at 1, 24, and 48 hours post treatment.

TABLE 19

Mean knockdown mortality (1 h) and mortality (24 h and 48 h) for CIELO formulations on indoor trial against caged *Aedes aegypti* CF strain applied with a Guarany 6 L ULV Knapsack Power Nebulisor in five locations in the house and three doses of Imidacloprid/1000 $m^2$ in Merida Yucatan, Mexico.

| Dose (g) | Site | Knockdown mortality % | Mortality at 24 h % | Mortality at 48 h % |
|---|---|---|---|---|
| 0.11 | Bedroom 1 | 0.44 | 1.78 | 2.22 |
| | Bedroom 2 | 4.00 | 5.33 | 5.33 |
| | Bathroom | 1.33 | 2.22 | 2.67 |
| | Dining room | 2.67 | 3.56 | 2.22 |
| | Living room | 4.00 | 5.33 | 6.22 |
| 0.33 | Bedroom 1 | 76.44 | 67.11 | 65.33 |
| | Bedroom 2 | 90.67 | 87.56 | 87.56 |
| | Bathroom | 90.22 | 90.67 | 84.89 |
| | Dining room | 96.00 | 95.56 | 95.11 |
| | Living room | 94.67 | 96.89 | 96.44 |
| 0.69 | Bedroom 1 | 100 | 100 | 100 |
| | Bedroom 2 | 100 | 100 | 100 |
| | Bathroom | 100 | 100 | 100 |
| | Dining room | 100 | 100 | 100 |
| | Living room | 100 | 100 | 100 |

TABLE 20

Mean frequency of knockdown mortality (1 h) and mortality (24 h and 48 h) and standard deviation for CIELO formulations on indoor trial against caged *Aedes aegypti* CF strain applied with a Guarany 6 L ULV Knapsack Power Nebulisor in five locations in the house and three doses of Imidacloprid/1000 $m^2$ in Merida Yucatan, Mexico.

| Dose (g) | Site | Knockdown mortality 1 h (SD) | Mortality at 24 h (SD) | Mortality at 48 h (SD) |
|---|---|---|---|---|
| 0.11[1] | Bedroom 1 | 0.004 (0.013) a | 0.018 (0.029) a | 0.022 (0.029) a |
| | Bedroom 2 | 0.040 (0.069) b | 0.053 (0.066) c | 0.053 (0.066) b |
| | Bathroom | 0.013 (0.020) a | 0.022 (0.029) b | 0.027 (0.020) a |
| | Dining room | 0.027 (0.035) a | 0.036 (0.047) b | 0.022 (0.041) a |
| | Living room | 0.040 (0.053) b | 0.053 (0.053) c | 0.062 (0.064) b |
| 0.33[2] | Bedroom 1 | 0.8764 (0.187) a | 0.671 (0.269) a | 0.653 (0.297) a |
| | Bedroom 2 | 0.907 (0.118) b | 0.876 (0.146) b | 0.876 (0.136) b |
| | Bathroom | 0.902 (0.119) b | 0.907 (0.134) b | 0.849 (0.269) b |
| | Dining room | 0.960 (0.085) b | 0.956 (0.107) b | 0.951 (0.120) b |
| | Living room | 0.947 (0.066) b | 0.969 (0.069) c | 0.964 (0.068) c |
| 0.69[3] | Bedroom 1 | 0.1 (0) c | 0.1 (0) c | 0.1 (0) c |
| | Bedroom 2 | 0.1 (0) c | 0.1 (0) c | 0.1 (0) c |
| | Bathroom | 0.1 (0) c | 0.1 (0) c | 0.1 (0) c |
| | Dining room | 0.1 (0) b | 0.1 (0) c | 0.1 (0) c |
| | Living room | 0.1 (0) b | 0.1 (0) c | 0.1 (0) c |

Probit Analysis. Results obtained in bioassays were subjected to probit analysis using POLO Plus Version 1(LeOra Software 2002-2017) to estimate the lethal dose to kill 90% of the population ($LD_{90}$) for each time of evaluation (24 hours and 48 hours). The significant difference between $LD_{90}$ parameter between times was determined by the overlap of the confidence intervals (Table 21).

TABLE 21

Statistics from Knockdown and Probit analysis for CIELO formulations in indoor trial against caged *Aedes aegypti* CF strain applied with a Guarany 6 L ULV Knapsack Power Nebulisor in Merida Yucatan, Mexico.

| Parameter | 1 h | 24 h | 48 h |
|---|---|---|---|
| $LD_{90}$ g/ha | 0.301 | 0.345 | 0.355 |
| CI (95%)[1] | 0.292-0.309 | 0.335-0.355 | 0.312-0.419 |
| Slope (SE)[2] | 7.430 (0.209) | 6.222 (0.173) | 6.053 (0.169) |

[1]Confidence interval at 95%
[2]Slope and standard error

Knockdown analysis showed that a dose of 0.301 g/1000 $m^2$ of Imidacloprid would kill the 90% of the population at 1 hour after exposure. Probit analysis showed that at 24 hours after exposure the estimated dose to cause 90% of mortality was 0.345 g/1000 $m^2$ and 0.355 g/1000 $m^2$ at 48 hours. The $LD_{90}$ at 1 hour was significantly lower in comparison with 24 hours and 48 hours ($P<0.05$). There was no difference between the $LD_{90}$ obtained at 24 and 48 hours (the confidence intervals overlap).

Results of the droplet size distribution analysis are reported in Table 22. ANOVA one-way factorial analysis was applied to establish differences between applications. Droplets were collected from all application rates, with significant difference detected between the low dose in comparison with the median and high doses.

TABLE 22

Teflon coated slide data from indoor trial.

| Dose (g/1000 $m^2$) | VMD μm (DE)[1] | Cloud NMD[2] | Slide density[3] |
|---|---|---|---|
| 0.11 | 3.6 (4.4) a | 2.3 (2.8) a | 2734.2 (2420.4) a |
| 0.33 | 12.3 (7.7) b | 1.9 (2.4) a | 2446.7 (1682.4) a |
| 0.69 | 16.8 (1.6) b | 2.1 (2.4) a | 3663.5 (1458.8) a |

[1]$F = 14.87$, d.f = 2, 24, $p = 0.00063$
[2]$F = 0.063$, d.f = 2, 24, $p = 0.939$
[3]$F = 1.009$, d.f = 2, 24, $p = 0.379$

Table 23 summarizes the meteorology information during the indoor trial. Weather conditions were similar between the three doses and replicates.

TABLE 23

Meteorological data during the indoor trial in Merida, Yucatan, Mexico.

| Dose | House | Temperature (° C.) | Relative Humidity (%) |
|---|---|---|---|
| Low | 1 | 31.3 (1.8) | 48.5 (3.1) |
| | 2 | 31.3 (1.8) | 48.7 (2.9) |
| | 3 | 31.0 (1.5) | 48.3 (2.1) |
| | 4 | 31.2 (1.7) | 48.9 (2.7) |
| | 5 | 31.4 (1.8) | 48.8 (2.8) |
| | 6 | 31.1 (1.6) | 48.8 (2.5) |
| | 7 | 31.2 (1.3) | 47.1 (2.5) |
| | 8 | 31.2 (1.2) | 47.3 (2.2) |
| | 9 | 31.2 (1.3) | 47.2 (2.3) |
| Medium | 1 | 31.6 (1.9) | 44.6 (2.1) |
| | 2 | 31.5 (1.9) | 44.9 (2.9) |
| | 3 | 31.7 (1.7) | 44.9 (2.3) |
| | 4 | 30.2 (1.6) | 39.5 (2.5) |
| | 5 | 30.2 (1.6) | 39.2 (2.7) |
| | 6 | 30.2 (1.5) | 39.4 (3.1) |
| | 7 | 30.2 (1.6) | 39.0 (2.4) |
| | 8 | 30.2 (1.6) | 39.8 (2.1) |
| | 9 | 30.2 (1.5) | 39.2 (2.7) |
| High | 1 | 30.1 (1.3) | 46.6 (3.5) |
| | 2 | 30.2 (1.5) | 46.4 (3.5) |
| | 3 | 31.2 (1.7) | 33.4 (1.9) |
| | 4 | 30.2 (1.4) | 46.7 (4.0) |
| | 5 | 30.1 (1.4) | 47.0 (3.6) |
| | 6 | 30.1 (1.4) | 47.0 (3.8) |
| | 7 | 31.0 (1.8) | 44.3 (3.3) |
| | 8 | 31.3 (1.9) | 44.6 (2.7) |
| | 9 | 31.3 (1.9) | 44.6 (2.7) |

Taken together, the indoor and outdoor field trials in Mexico data demonstrate that CIELO formulations are useful and effective, including when applied as a ULV space spray for use in indoor and outdoor applications. CIELO formulations are effective as an adulticide against local populations of *Aedes aegypti*, the vector of dengue, chikungunya, and Zika viruses.

In one embodiment, a dosage of 3.43 g/ha of the active ingredient, Imidacloprid, produced 90% mortality of the mosquito population at 1 hour in open field applications with truck-mounted ultra-low volume (ULV) cold aerosol sprayer and with droplet size less than 30 μm (i.e., knockdown mortality).

A dosage of 0.301 g of the active ingredient, Imidacloprid, per 1000 $m^2$ produced 90% mortality (i.e., knockdown mortality) of the mosquito population at 1 hOUR in indoor applications with a portable ULV Nebulisor. For 24 and 48 hour evaluations, 0.345 g/1000 $m^2$ and 0.355 g/1000 $m^2$ of Imidacloprid/1000 $m^2$, respectively, produced 90% mortality in indoor applications.

Example 12: Outdoor Field Trial

The majority of the Brazilian trials were completed in the cities of Marilia with a few completed in Santos, SP, Brazil. Marilia is located in the western part of Sao Paulo state at a latitude of −22° 12'50" South and longitude of −49° 56'45" West, with an altitude of 679 meters. The climate is subtropical. The average annual temperature in Marilia is 19.9° C. Average annual rainfall of 1291 mm. The average variation of temperature during the year is 7.1° C. The city has been infested by *Aedes aegypti* since 1988. *Aedes albopictus*, although present, is more prevalent on peripheral areas, related to the presence of vegetation. Santos is a city by the coast (South latitude −23° 93' 37" and −46° 33'13" longitude West) in the eastern part of the Sao Paolo state. The climate is warm and humid with the driest month presenting an average of 60 mm of rain. Santos presents a high incidence of dengue.

Assays were performed with non-blood fed *Aedes aegypti* female aged two to five days. The population was from the local city, Marilia, and comes from a colony established from field-collected eggs. The colony had been maintained according to local protocol and it had been tested for susceptibility to insecticides on a yearly basis and the results indicate susceptibility to pyrethroids.

Efficacy testing of the CMP123-004 was evaluated with female mosquitoes exposed in cylindrical disposable cages to space spray product under relatively controlled and comparable settings. The tests were carried out in flat areas, not inhabited, without vegetation or with undergrowth.

Doses were 2, 3 and 4 g of Imidacloprid per hectare, with flow rates between 125 and 270 ml/min. Five g of Imidacloprid active ingredient per hectare was also tested to provide sufficient data for estimating lethal dose concentrations by the probit analysis method.

Efficacy of the treatment was measured by the mortality assessment of sentinel cages. The mean mortality and standard deviation were calculated by dose and treatment distance. The comparison of mortality by distance was performed by ANOVA after conversion of the percentage data by arcsin values. For the estimation of lethal dose, the time of 48 hours was considered as final mortality per dose applied. Data from the three treatment dose replicates were pooled to estimate lethal doses 80, 90, 95, and 99% through probit regression analysis of dose and mortality data using Raymond's Basic software.

Pre-treatment droplet size measurements were performed using the DC-IV equipment and portable dropping system (KLD Laboratories, Huntington Station, NY, USA). The size and distribution of the droplets in the nebulization were evaluated by the use of rotary slide impingers from Leading Edge Associates. Drops were collected in pairs of 25×75 mm sheets impregnated with Teflon and arranged on stakes at the same height (1.5 m) of the sentinel cages and at the center of the fourth treatment distances as shown in FIG. 5. The drops were analyzed using a dispersion factor of 0.7. A pair of blades was also collected in a rotating collector paired with the control cages. Collectors were attached before treatment and remained bound for the same time exposure of the cages (15 minutes). The slides collected were transferred to the laboratory and read under a microscope equipped with an ocular micrometer at a magnification of 400×. A minimum of 200 drops were read per slide. Droplet spectrum analysis was performed using software from RemSPC Corporation.

The percentages of mortality observed in the cages under the control situation (non-treated) are in Table 24. There was no need for mortality correction because the values in all control tests were lower than 5%.

In each treatment, the time of application (timer with the LECO machine operator) was recorded. Flow rate was measured before and after the treatment, and the distance (in meters) travelled by the vehicle with the nebulizer equipment was recorded for each treatment. For the calculation of applied dose, the following parameters were considered:

(i) treated area (given by the course of the machine and distance from the sentinel cages);

(ii) Milliliters of product per minute measured before and after treatment and time of application (in minutes);

(iii) The speed of the spray vehicle was 13 km/h.

The treatments that presented meteorological conditions within the predicted parameters and the intended flow rate were considered valid, and the mortality data for those treatments were used for the statistical analysis. Due to unfavorable weather and site location issues in the Santos region the majority (11 out of 13) of trials were from the Marilia region. Information of tests by dose of treatment is given in Table 24. The mortality data for each treatment is not shown but can be provided upon request. The mean percentages of mortality and their standard deviation were calculated from the data observed in the sentinel cages by dose and distance and are listed in Table 25.

TABLE 24

List of tests performed according to planned dose. Mortality observed in non-treated replicates.

| Test | Planned dose[1] | Obtained dose | Number of female exposed | % Mortality in non treated cages |
|---|---|---|---|---|
| (test 2) | 2.0/0.5 | 0.9 | 298 | 0.0 |
| (test 1) | | 1.9 | 359 | 0.0 |
| (test 4) | 2.0/0.5 | 2.2 | 396 | 0.9 |
| (test 5) | | 2.4 | 398 | 0.0 |
| (test 5) | | 2.7 | 373 | 0.9 |
| (test 3) | 3.0/0.75 | 2.9 | 395 | 3.0 |
| (test 2) | | 3.0 | 406 | 1.0 |
| [2](test 6) | | 3.6 | 316 | 0.0 |
| [2](test 3) | 4.0/1.0 | 3.7 | 333 | 0.0 |
| (test 2) | | 4.4 | 399 | 0.0 |
| (test 6) | | 4.8 | 383 | 0.0 |
| (test 2) | 5.0/1.25 | 5.4 | 376 | 2.0 |
| (test 3) | | 5.8 | 374 | 2.0 |

[1]Dose rate is in g/ha of Imidacloprid/Prallethrin

[2]Indicates trials conducted in the Santos region, all other outdoor trials were conducted in the Marilia region.

TABLE 25

Average percentage of mortality (standard deviation) observed in tests with application of CMP123-004 with Leco machine. Data listed by dose and distance from the nozzle and time post treatment.

| Distance | Dose* | 2 | | | 3 | | | 4 | | | 5 | | |
|---|---|---|---|---|---|---|---|---|---|---|---|---|---|
| (m) | Parameter | 1 h | 24 h | 48 h | 1 h | 24 h | 48 h | 1 h | 24 h | 48 h | 1 h | 24 h | 48 h |
| 25 | Average | 92.4 | 91.5 | 88.4 | 94.4 | 97.9 | 96.9 | 100 | 99.3 | 98.3 | 100 | 99.7 | 99.3 |
| | (s.d.)** | 19.2 | 18.8 | 20.3 | 8.5 | 4.2 | 5.5 | 0.0 | 2.3 | 2.7 | 0.0 | 1.2 | 2.3 |
| 50 | Average | 90.4 | 84.5 | 79.9 | 94.3 | 93.4 | 87.6 | 99.0 | 96.7 | 95.8 | 100 | 100.0 | 99.6 |
| | (s.d.)** | 12.4 | 20.9 | 18.9 | 8.7 | 6.1 | 13.1 | 3.6 | 7.2 | 8.7 | 0.0 | 0.0 | 1.3 |
| 75 | Average | 95.7 | 88.1 | 83.6 | 98.6 | 91.8 | 88.8 | 97.4 | 93.2 | 90.2 | 100 | 98.6 | 97.9 |
| | (s.d.)** | 7.4 | 15.2 | 18.9 | 2.7 | 12.7 | 12.8 | 4.3 | 9.6 | 9.4 | 0.0 | 3.7 | 6.0 |
| 100 | Average | 82.9 | 62.0 | 59.3 | 87.3 | 79.3 | 66.7 | 90.8 | 80.7 | 76.3 | 98.9 | 95.6 | 95.2 |
| | (s.d.)** | 18.7 | 33.0 | 29.0 | 15.2 | 12.1 | 14.4 | 22.7 | 30.6 | 27.6 | 2.6 | 8.8 | 8.2 |

*dose = g Imidacloprid per hectare of treated area. Ration Imidacloprid to Prallethrin is 4:1

(s.d)** = standard deviation

The comparison of the mortality observed according to the distance by analysis of variance (ANOVA) showed that, for the shortest distance from the applicator, 25 meters, there was no significant difference between the four doses applied (p=0.1244). For the other three distances (50 m, 75 m, 100 m), the mortality were significantly different, depending on the dose applied. The p values were, respectively for 50, 75, and 100 meters: 0.001; 0.006 and $1.8\times10^{-7}$. A nonparametric test (Kruskal Wallis) was used to compare the mortality by pair of doses applied. This analysis revealed a significant difference between doses according to distance. At 50 meters from the spray there was no significant difference in mortality (p=0.3894) between doses of 2 and 3 g imidacloprid per hectare. The other dose rates did show significant differences at 50 m (p <0.05). At 75 m, all doses gave significantly different percentages of mortality (p<0.05) and at 100 m the dose of 5 g Imidacloprid/1.25 g Prallethrin was the only one that differed from all other doses (p<0.05).

For the estimation of lethal dose, the time of 48 hours was considered the endpoint for determining mortality per dose applied (i.e., efficacy parameter). Data from the three repetitions of each of the 4 dose rates was pooled. Estimation of lethal dose at 80, 90, 95, and 99% was obtained by probit analysis with the use of the software Basic. The doses and its confident limits are presented in Table 26.

TABLE 26

Lethal doses obtained by probit analysis for three distances from the application of CMP123-0004.

| | Distance from application (meters) | | |
|---|---|---|---|
| Lethal Dose* | 50 | 75 | 100 |
| 80% | 1.8 a | 1.8 a | 2.1 b |
| f.l.** | (1.7-1.9) | (1.7-1.9) | (2.0-2.2) |
| 90% | 2.5 a | 2.5 a | 2.9 b |
| f.l.** | (2.4-2.7) | (2.3-2.6) | (2.7-3.1) |
| 95% | 3.3 a | 3.1 a | 3.7 a |
| f.l.** | (3.1-3.6) | (2.9-3.4) | (3.5-4.1) |
| 99% | 5.5 a | 4.8 a | 6.0 a |
| f.l.** | (4.9-6.3) | (4.3-5.6) | (5.4-6.9) |
| Slope | 3.07 | 3.56 | 3.29 |

*lethal dose in g of active ingredient (Imidacloprid) per hectare, Ratio of Imidacloprid to Prallethrin is 4:1;
**f.l. = fiducial limits The letters (a, b) indicate how lines of data compare (average mortality at each distance). The same letters indicate a non-significant difference, and different letters state indicate a significant difference. Lethal doses were different only at the distance of 100 meters from the nozzle, and only for doses yielding mortality lower than 90%.

Droplet analysis was completed for all trials. The VMD of droplets were in the range 16.0-22.6 μm for all tests completed (Table 27).

TABLE 27

Characterization of the spray in treatment with LECO machine. Values obtained by analysis of collect droplets by the RemSPcc Corporation software.

| Test | Dose (g i.a./ha) | VMD | NMD | Density (croplets/cm$^2$) |
|---|---|---|---|---|
| Test 2 | 0.9 | 19.0 | 11.2 | 18.8 |
| Test_1 | 1.9 | 19.2 | 10.0 | 1005.5 |
| Test_4 | 2.2 | 20.9 | 10.0 | 839.1 |
| Test_5 | 2.5 | 18.0 | 7.8 | 1208.0 |
| Test_5 | 2.7 | 20.2 | 10.3 | 733.7 |

TABLE 27-continued

Characterization of the spray in treatment with LECO machine. Values obtained by analysis of collect droplets by the RemSPcc Corporation software.

| Test | Dose (g i.a./ha) | VMD | NMD | Density (croplets/cm$^2$) |
|---|---|---|---|---|
| Test_3 | 2.9 | 21.4 | 7.8 | 246.2 |
| Test_2 | 3.0 | 20.5 | 10.7 | 458.6 |
| Test_6 | 3.6 | 16.0 | 4.0 | 1249.0 |
| Test_3 | 3.7 | 16.1 | 3.5 | 1245.5 |
| Test_2 | 4.4 | 20.9 | 8.2 | 611.8 |
| Test_6 | 4.8 | 18.6 | 6.3 | 1054.9 |
| Test_2 | 5.4 | 19.7 | 8.4 | 1203.5 |
| Test_3 | 5.8 | 22.6 | 12.4 | 959.3 |

Example 13: Indoor Field Trial

Indoor field trials were performed inside unoccupied houses in the municipality of Marilia. Sentinel cages were distributed inside the buildings. The treatment was carried out from outside with the spray jet going inwards from the entrances (windows and doors). Immediately after application the doors and windows were closed.

Treatment parameters predicted doses of 0.2, 0.3, and 0.4 g of Imidacloprid per 1000 m$^2$, with flow rates ranging from 22 to 30 ml/min. Nevertheless, it was not possible to apply the CIELO formulation directly without dilution. This is due mainly to the low use rates and the small areas of the individual rooms in the test houses. For these indoor trials the product was diluted with Polyethyleneglycol (PEG 400), in a ratio of one part product to nine parts PEG 400 oil, before application. PEG 400 was chosen as the dilution vehicle as it was known to offer complete miscibility with the CIELO formulation.

In each house, five sentinel cages were distributed between rooms, bedrooms, kitchen and bathroom. The cages were placed 25 cm from the floor in the corner of each room. Each cage contained a total of 25 non-blood fed females, aged 2-5 days. The number of females per property, therefore, was 125. Each treatment was accompanied by a control with distribution of five cages, in the same conditions of the treated property, but in untreated property.

The cages remained inside the house for 60 minutes after the treatment. After reading knock-down, the females were transferred from clean cages to provide observation of mortality after 24 and 48 hours. The observation cups were paperboard (240 ml), covered with a tulle and containing cotton soaked in 10% honey solution. These were placed in Styrofoam boxes, sealed for recovery of the females and kept in the laboratory at 25±2° C. temperature and 80%±10% RH. The applied dose was estimated by recording time of spray, taking flow rate before and the estimation of volume applied divided by the area treated (in m$^2$).

The comparison of mortality observed by each dose was analyzed by ANOVA and paired comparison by Mann Whitney test. The mortality observed by each dose (Table 28) was significantly different from the others (p<0.05), except for dose 0.2 g imidacloprid/1000 m$^2$ which presented a significantly higher mortality after one hour post treatment when compared to mortality observed at 24 and 48 hours post treatment (p>0.05).

TABLE 28

Average mortality observed in *Aedes aegypti* female exposed to indoor reatment of CIELO.

| Dose (g/a.i./100 m$^2$) | Parameter | Mortality % 1 h | 24 h | 48 h |
|---|---|---|---|---|
| 0.02 | Average | 0 | 3.2 | 4.2 |
| | s.d. | 0 | 4.4 | 4.3 |
| 0.04 | Average | 5.7 | 0.8 | 2.4 |
| | s.d. | 8 | 1.9 | 3.6 |
| 0.05 | Average | 1.6 | 2.6 | 2.8 |
| | s.d. | 4.4 | 5.2 | 5.7 |
| 0.2 | Average | 53.4 | 29.2 | 26.7 |
| | s.d. | 28.3 | 25.8 | 24.8 |
| 0.3 | Average | 50.07 | 50.3 | 49 |
| | s.d. | 35.4 | 34.4 | 34.4 |
| 0.4 | Average | 81.3 | 71 | 71 |
| | s.d. | 26.8 | 35.9 | 35.4 |
| 0.5 | Average | 95.4 | 86.5 | 89.3 |
| | s.d. | 6.5 | 22.2 | 16.1 |
| 0.7 | Average | 96.9 | 99.2 | 99.6 |
| | s.d. | 5.6 | 2.5 | 1.2 |
| 0.8 | Average | 97.7 | 100 | 100 |
| | s.d. | 3.3 | 0 | 0 |
| 0.9 | Average | 99.7 | 100 | 99 |
| | s.d. | 1 | 0 | 1.7 |
| 1.1 | Average | 91.8 | 99 | 98 |
| | s.d. | 11.4 | 1.8 | 2.2 |

For the estimation of lethal dose, the time of 48 hours was considered the endpoint for determining mortality per dose applied (i.e., efficacy parameter). Data from all tests were pooled by dose. In addition to dose rates of 0.2, 0.3, and 0.4 g imidacloprid/1000 m$^2$, three other dose rates (0.04, 0.5, and pooled data from 0.7/0.8/0.9) were used for probit analysis. The lethal dose 80, 90, 95, and 99% were calculated with confidence limits in Table 29.

Table 29. Lethal doses obtained by probit analysis for three distances from the application of CMP123-0004 with portable machine. Dose in g imidacloprid/1000 m$^2$. Ratio of Imidacloprid to Prallethrin is 4:1.

TABLE 29

Lethal doses obtained by probit analysis for three distances from the application of CMP123-0004 with portable machine. Dose in g imidacloprid 1000 m$^2$. Ratio of Imidacloprid to Prallethrin is 4:1.

| Lethal Dose* | Time Post Treatment KD | 24 | 48 |
|---|---|---|---|
| 80% | 0.33 | 0.49 | 0.42 |
| f.l..** | (0.31-0.36) | (0.496-0.53) | (0.41-0.44) |
| 90% | 0.46 | 0.65 | 0.50 |
| f.l..** | (0.42-0.49) | (0.59-0.72) | (0.48-0.52) |
| 95% | 0.6 | 0.81 | 0.58 |
| f.l..** | (0.54-0.65) | (0.72-0.94) | (0.55-0.61) |
| 99% | 0.95 | 1.24 | 0.75 |
| f.l..** | (0.84-1.1) | (1.10-1.51) | (0.70-0.82) |
| Slope | 3.2 | 3.7 | 5.9 |

**f.l. = fiducial limits

Droplet size analysis data is summarized in Table 30 and described by applied dose.

TABLE 30

Characterization of the spray in treatment with Portable Guarany P2 machine. Values obtained by analysis of collect droplets by the RemSPcc Corporation software.

| Dose | VMD | MDN | Density (droplets/cm$^2$) |
|---|---|---|---|
| 0.02 | 22.7 | 13.6 | 6597.6 |
| 0.04 | 25.1 | 9.4 | 6438.25 |
| 0.05 | 23.3 | 9.5 | 6788.9 |
| 0.05 | 19.5 | 3.6 | 9732 |
| 0.2 | 24.2 | 15.2 | 8254.98 |
| 0.2 | 19.72 | 2.3 | 13628.7 |
| 0.3 | 21.08 | 6.7 | 7222.32 |
| 0.3 | 19.85 | 6.25 | 4350.6 |
| 0.4 | 19.86 | 6.1 | 10571 |
| 0.4 | 16.4 | 9.05 | 4015.94 |
| 0.4 | 26.2 | 7 | 13386.5 |
| 0.5 | 23.8 | 1.8 | 13936.2 |
| 0.7 | 25.9 | 6.35 | 5391.7 |
| 0.8 | 24.3 | 15.7 | 6629.4 |
| 0.9 | 25.8 | 12.1 | 6433.7 |
| 1.1 | 24.6 | 14.5 | 6406.38 |

Example 14: Outdoor Aerial Spray Field Trial

Three block sprays were conducted in the vicinity of Valle de Banderas, Mexico to assess the efficacy of the CIELO formulation on caged *Aedes aegypti* from a colony established from native *Aedes aegypti* (two trials) and from wild caught mosquitoes (one trial). Across the block, ground contours ranged from 50 m in the south to 90 m in the north. At 12 sites, cages with 25 mosquitoes (*Aedes aegypti*) were placed on poles 1.5 m agl. Collocated at some sites were Leading Edge impingers to measure drop size and drop density within the passing cloud. Mid-way along the sample line, a blimp was flown at 60 m to measure meteorology (wind speed, direction, temperature and humidity) at the proposed spray height.

A Cessna 206H was equipped with 4 Micronair AU5000s at mid and outer positions on the wings. The Micronairs were setup to spin at 8000 rpm (loaded) at an aircraft speed of 180 kph producing a spray with a VMD of 50 μm. On the starboard wing, just inside the outer mounting bracket, an Aventech AIMMS-30 probe was mounted to provide in-situ meteorology at the aircraft. Target application parameters for the trials were spray height 60 m, swath 150 m and application rate 110 mL CIELO/Ha.

Flow Calibration. Before block sprays, flow from the 4 Micronairs was confirmed to ensure an application rate of 110 mL/Ha. Flows were adjusted for application parameters: swath (150 m) and aircraft speed (177 km/hr). At a boom pressure of 17 psi (117 kpa), three of four atomizer flows were within 5% of target while the starboard wingtip atomizer was typically high. However, total flow (relevant for application rate) was within 2% of target.

Drop Size Calibration. Drop size calibration flights were completed between flow calibrations and block sprays. The Cessna 206H sprayed at a height of 10 m over an array of five impingers (Leading Edge) aligned close to cross wind and positioned out to 60 m on either side of the flight line.

Figure 7A:
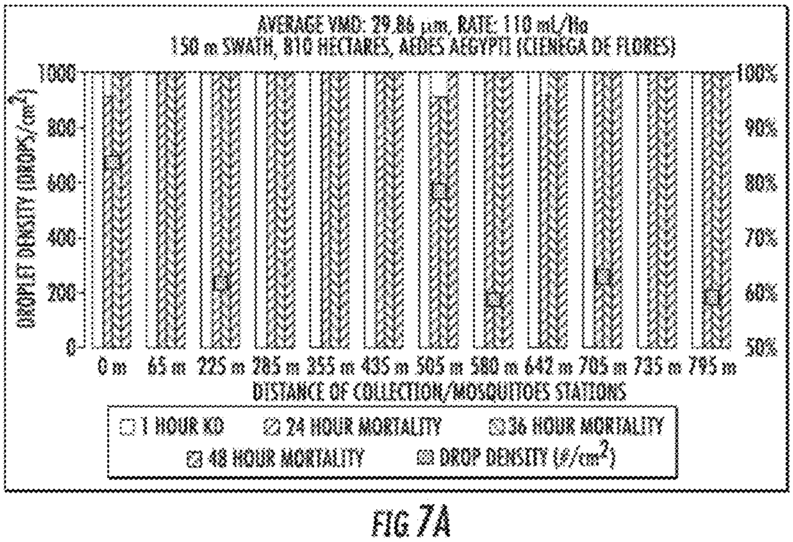
FIGS. 7A-7C include representative droplet densities (average VVID of 29.86 μm, 34.01 μm, and 35.9 μm, respectively), and mortality percentages for mosquitos at one hour, 24 hours, 36 hours, and 48 hours post treatment with insecticidal formulations for three different aerial spray field trials.

Block Sprays. In the first outdoor aerial spray field trial, the impact on caged mosquitoes sprayed with the CIELO formulation was assessed at 1 hour for knockdown and at 24, 36, and 48 hours for mortality (FIG. 7A). Mortality in two controls was less than 4% over the 48 hour sampling period. Drop density on spinning slides ranged from 200 drops/cm$^2$ at the eastern end of the sample line to greater than 600 drops/cm$^2$ at the western end. Knockdown at 1 hour was 100% along the 795 m sample line. Beyond 24 hours, mortality exceeded 95% with most sites showing 100% mortality. There is no correlation between sites with sub-100% mortality (1 survival in test group) and drop density.

Figure 7B:
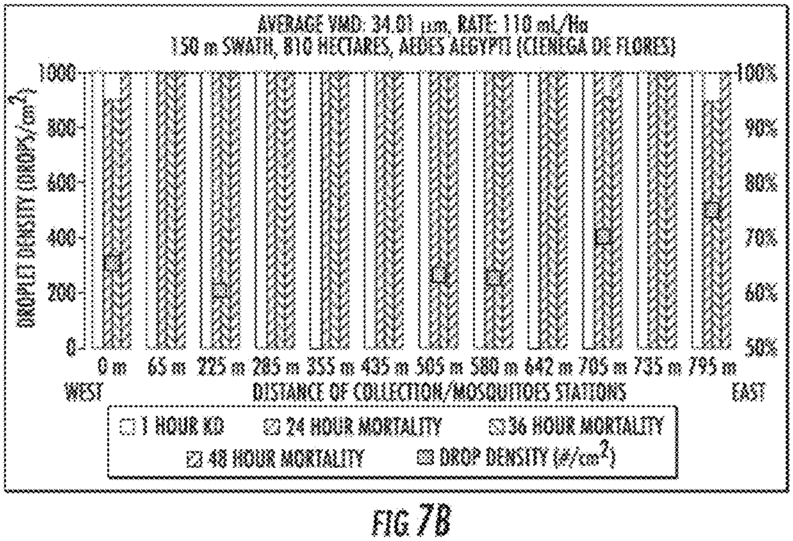

The second outdoor aerial spray field trial was completed in a similar manner. Spray height was as low as 40 m or higher than 100 m agl, depending on terrain. Application rate of the CIELO formulation remained within 10% of 110 mL/Ha given the variation in flight speed over the block. Slide drop density across the sample grid (FIG. 7B) ranged from 200 drops/cm$^2$ in the west increasing to close to 500 drops/cm$^2$ at the eastern end with the line average of 322 drops/cm$^2$. Knockdown at 1 hour was 100% at all sites (FIG. 7B). Most sites had 100% mortality at 24 hours and beyond with three sites exhibiting mortality reflecting one surviving mosquito in a sample size of 22-25. Paired controls had 0% mortality over the sampling period of 48 hours. There was no correlation between sites with sub-100% mortality and drop density.

During the third outdoor aerial spray field trial, spray height was considerably higher than the two previous trials. Generally, spray heights exceeded 100 m and at times 150 m agl. Caged mosquito were restricted to eight sites with four sites having spinners collocated. Species composition is given in Table 31.

TABLE 31

Species composition of caged mosquitos for third outdoor aerial spray field trial.

| Species Composition: | |
|---|---|
| *Aedes vexans* | 55% |
| *Psorophora* spp. | 29% |
| *Anopheles albimanus* | 9% |
| *Aedes aegypti* | 5% |
| *Culex* spp. | 1% |

Figure 7C:
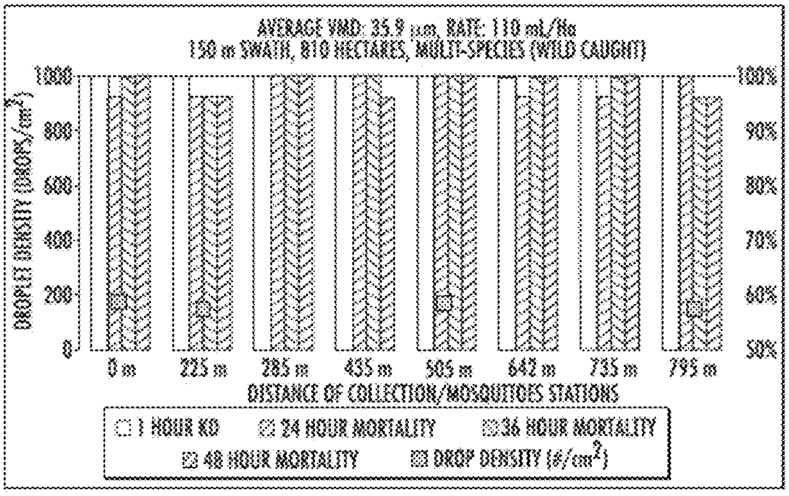

Across the sample grid, drop density was relatively uniform ranging from 153 to 177 drops/cm$^2$ (FIG. 7C). Line average was 164 drops/cm$^2$, significantly lower than August sprays when averages were closer to 350 drops/cm$^2$. Lower drop count was probably due to higher winds and higher spray heights leading to more diffusion in the cloud before reaching the surface layer. Knockdown at all sites was 100%. While generally all sites had mortality that was less than 100% over the following 48 hour period, reduced mortalities again represented only one survival in a 24-28 mosquito sample in each cage.

Block sprays in these trials encompassed ideal spray conditions of moderate spray height and winds less than 15 kph (at spray height) to extreme conditions of high spray height and high winds. Utilizing flight line offset procedures to maximize cloud density within the block led to high mortality at sampling sites within the block. Maintaining slide drop density above 150 drops/cm$^2$ within the block resulted in 1 hour knockdown of 100% and mortality that exceeded 95% for caged *Aedes aegypti.*

Various changes and modifications to the disclosed embodiments will be apparent to those skilled in the art. Such changes and modifications, including without limitation those relating to the chemical structures, substituents, derivatives, intermediates, syntheses, compositions, formulations, or methods of use of the disclosure, may be made without departing from the spirit and scope thereof.

For reasons of completeness, various aspects of the disclosure are set out in the following numbered clauses:

Clause 1. An insecticidal composition comprising: at least one insecticide; a polyalkylene block copolymer wetting agent, a polyalkylene carbonate, and a polyalkylene glycol.

Clause 2. The composition of clause 1, wherein the at least one insecticide comprises at least one of a pyrethrin, a pyrethroid, a neonicotinoid, a carbamate, an organophosphate, an organochlorine, a sulfoximine, or combinations thereof.

Clause 3. The composition according to clause 1 or clause 2, wherein the at least one insecticide comprises at least one of imidacloprid and prallethrin.

Clause 4. The composition according to clause 1 or clause 2, wherein the at least one insecticide comprises at least one of sumithrin and prallethrin.

Clause 5. The composition according to any of clauses 1 to 4, wherein the at least one insecticide is present in an amount from about 2.5% by weight to about 10% by weight.

Clause 6. The composition according to any of clauses 1 to 5, wherein the polyalkylene block copolymer wetting agent is a block copolymer comprising a $C_{2-5}$ polyalkylene glycol and a $C_{3-6}$ polyalkylene glycol.

Clause 7. The composition according to clause 6, wherein the polyalkylene block copolymer wetting agent is a block copolymer comprising polyethylene glycol and polypropylene glycol.

Clause 8. The composition according to any of clauses 1 to 7, wherein the block copolymer is present in an amount from about 2.5% by weight to about 20% by weight.

Clause 9. The composition according to any of clauses 1 to 8, wherein the polyalkylene carbonate is a $C_{2-4}$ alkylene carbonate.

Clause 10. The composition according to clause 9, wherein the polyalkylene carbonate is propylene carbonate.

Clause 11. The composition according to any of clauses 1 to 10, wherein the polyalkylene carbonate is present in an amount from about 15% to about 40% by weight.

Clause 12. The composition according to any of clauses 1 to 11, wherein the polyalkylene glycol is a $C_{2-6}$ polyalkylene glycol.

Clause 13. The composition according to clause 12, wherein the polyalkylene glycol is polyethylene glycol.

Clause 14. The composition according to any of clauses 1 to 13, wherein the polyalkylene glycol is present in an amount from about 25% to about 75% by weight.

Clause 15. The composition according to any of clauses 1 to 14, wherein the composition further comprises carvone.

Clause 16. The composition according to clause 15, wherein the carvone is 1-carvone.

Clause 17. The composition according to any of clauses 1 to 16, wherein the composition further comprises piperonyl butoxide (PBO).

Clause 18. The composition according to any of clauses 1 to 17, wherein the composition further comprises one or more of a carrier, solvent, diluent, surfactant, emulsifier, dispersant, stabilizer, suspending agent, penetrant, antioxidant, UV-absorbing, or auxiliary agent.

Clause 19. A method for insect control, the method comprising: contacting a population of insects with an insecticidal composition comprising: at least one insecticide; a polyalkylene block copolymer wetting agent, a polyalkylene carbonate, and a polyalkylene glycol.

Clause 20. The method according to clause 19, wherein the composition is applied as an aerosol or fog, and wherein the aerosol or fog contacts the population of insects.

Clause 21. The method according to clause 19 or clause 20, wherein the composition is applied to a surface before contacting the population of insects.

Clause 22. The method according to any of clauses 19 to 21, wherein the composition is applied using an ultra low volume (ULV) sprayer.

Clause 23. The method according to any of clauses 19 to 22, wherein the population of insects comprises mosquitos selected from the group consisting of *Aedes* sp., *Culex* sp., and *Anopheles* sp.

Clause 24. The method according to any of clauses 19 to 23, wherein the composition has an evaporation rate of less than about 2 $\mu m^2 \cdot s^{-1} \cdot {}^\circ$ C.

Clause 25. The method according to any of clauses 19 to 24, wherein the composition has a non-volatile fraction of more than about 50%.

Clause 26. The method according to any of clauses 19 to 25, wherein the composition has a density from about 1 g/mL to about 1.2 g/mL.

Clause 27. An insecticidal composition comprising: at least one insecticide; a polyalkylene block copolymer wetting agent, a polyalkylene carbonate, and a polyalkylene glycol; wherein presence of the wetting agent in the insecticidal composition increases insect mortality as compared to an insecticidal composition lacking the wetting agent.

Clause 28. A method for insect control, the method comprising: contacting a population of insects with an insecticidal composition comprising: at least one insecticide; a polyalkylene block copolymer wetting agent, a polyalkylene carbonate, and a polyalkylene glycol; wherein contacting the population of insects with the composition increases insect mortality as compared to an insecticidal composition lacking the wetting agent.

Clause 29. The method according to clause 28, wherein the composition increases insect mortality by at least 25% as compared to an insecticidal composition lacking the wetting agent.

We claim:

1. An insecticidal composition comprising:

at least one insecticide;

a polyalkylene block copolymer wetting agent present in an amount from 5 wt % to 20 wt %, wherein the polyalkylene block copolymer wetting agent is a block copolymer comprising a $C_{2-3}$ polyalkylene glycol and a $C_{3-6}$ polyalkylene glycol;

a polyalkylene carbonate, and a polyalkylene glycol.

2. The composition of claim 1, wherein the at least one insecticide comprises at least one of a pyrethrin, a pyrethroid, a neonicotinoid, a carbamate, an organophosphate, an organochlorine, and a sulfoximine.

3. The composition of claim 1, wherein the at least one insecticide comprises at least one of imidacloprid and prallethrin; and wherein the at least one insecticide is present in an amount from about 2.5% by weight to about 10% by weight.

4. The composition of claim 1, wherein the at least one insecticide comprises at least one of sumithrin and prallethrin; and wherein the at least one insecticide is present in an amount from about 2.5% by weight to about 10% by weight.

5. The composition of claim 1, wherein the polyalkylene block copolymer wetting agent is a block copolymer comprising polyethylene glycol and polypropylene glycol.

6. The composition of claim 1, wherein the polyalkylene carbonate is a $C_{2-4}$ alkylene carbonate.

7. The composition of claim 6, wherein the polyalkylene carbonate is propylene carbonate.

8. The composition of claim 1, wherein the polyalkylene carbonate is present in an amount from about 15% to about 40% by weight.

9. The composition of claim 1, wherein the polyalkylene glycol is a $C_{2-6}$ polyalkylene glycol; and wherein the polyalkylene glycol is present in an amount from about 25% to about 75% by weight.

10. The composition of claim 9, wherein the polyalkylene glycol is polyethylene glycol.

11. The composition of claim 1, wherein the composition further comprises carvone.

12. The composition of claim 11, wherein the carvone is 1-carvone.

13. The composition of claim 1, wherein the composition further comprises piperonyl butoxide (PBO).

14. The composition of claim 1, wherein the composition further comprises one or more of a carrier, solvent, diluent, surfactant, emulsifier, dispersant, stabilizer, suspending agent, penetrant, antioxidant, UV-absorbing, or auxiliary agent.

15. A method for insect control, the method comprising:

contacting a population of insects with an insecticidal composition comprising:

at least one insecticide;

a polyalkylene block copolymer wetting agent present in an amount from 5 wt % to 20 wt %, wherein the polyalkylene block copolymer wetting agent is a block copolymer comprising a $C_{2-3}$ polyalkylene glycol and a $C_{3-6}$ polyalkylene glycol, a polyalkylene carbonate, and a polyalkylene glycol, wherein the insecticidal composition has a density from about 1 g/mL to about 1.2 g/mL.

16. The method of claim 15, wherein the composition is applied as an aerosol or fog; and wherein the population of insects comprises mosquitos selected from the group consisting of *Aedes* sp., *Culex* sp., and *Anopheles* sp.

17. The method of claim 15, wherein the composition is applied using an ultra low volume (UL V) sprayer.

18. The method of claim 15, wherein the composition has an evaporation rate of less than about 2 $\mu m^2 \cdot s^{-1} \cdot {}^\circ$ C.

19. The method of claim 15, wherein the composition has a non-volatile fraction of more than about 50%.

20. An insecticidal composition comprising:

at least one insecticide;

a polyalkylene block copolymer wetting agent present in an amount from 5 wt % to 20 wt %, wherein the polyalkylene block copolymer wetting agent is a block copolymer comprising a $C_{2-3}$ polyalkylene glycol and a $C_{3-6}$ polyalkylene glycol, a polyalkylene carbonate, and a polyalkylene glycol;

wherein presence of the wetting agent in the insecticidal composition increases insect mortality as compared to an insecticidal composition lacking the wetting agent; and wherein the insecticidal composition has an evaporation rate of less than about 2 $\mu m^2 \cdot s^{-1} \cdot {}^\circ$ C.

* * * * *